(12) United States Patent
Sano et al.

(10) Patent No.: US 11,976,437 B2
(45) Date of Patent: May 7, 2024

(54) SHOVEL

(71) Applicant: SUMITOMO HEAVY INDUSTRIES, LTD., Tokyo (JP)

(72) Inventors: Yusuke Sano, Kanagawa (JP); Chunnan Wu, Kanagawa (JP); Kazunori Hiranuma, Kanagawa (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 418 days.

(21) Appl. No.: 17/448,728

(22) Filed: Sep. 24, 2021

(65) Prior Publication Data

US 2022/0010520 A1 Jan. 13, 2022

Related U.S. Application Data

(63) Continuation of application No. PCT/JP2020/014224, filed on Mar. 27, 2020.

(30) Foreign Application Priority Data

Mar. 29, 2019 (JP) .................................. 2019-069240

(51) Int. Cl.
| | |
|---|---|
| *E02F 3/32* | (2006.01) |
| *E02F 3/43* | (2006.01) |
| *E02F 9/20* | (2006.01) |
| *E02F 9/22* | (2006.01) |
| *E02F 9/26* | (2006.01) |
| *G01G 19/08* | (2006.01) |

(52) U.S. Cl.
CPC ................ *E02F 3/435* (2013.01); *E02F 3/32* (2013.01); *E02F 9/2029* (2013.01); *E02F 9/2228* (2013.01); *E02F 9/2267* (2013.01); *E02F 9/2271* (2013.01); *E02F 9/262* (2013.01); *G01G 19/08* (2013.01); *E02F 9/2285* (2013.01); *E02F 9/2292* (2013.01); *E02F 9/2296* (2013.01)

(58) Field of Classification Search
CPC . E02F 3/435; E02F 3/32; E02F 9/2029; E02F 9/2228; E02F 9/2267; E02F 9/2271; E02F 9/262; E02F 9/2285; E02F 9/2292; E02F 9/2296; G01G 19/08
See application file for complete search history.

(56) References Cited

U.S. PATENT DOCUMENTS

| | | | |
|---|---|---|---|
| 5,714,719 | A | 2/1998 | Otsuka et al. |
| 5,824,965 | A | 10/1998 | Fujii et al. |
| 2018/0120098 | A1 | 5/2018 | Matsuo et al. |

(Continued)

FOREIGN PATENT DOCUMENTS

| | | |
|---|---|---|
| DE | 102014004876 | 9/2015 |
| JP | S59-098935 | 6/1984 |
| JP | H04-176918 | 6/1992 |

(Continued)

OTHER PUBLICATIONS

International Search Report for PCT/JP2020/014224 dated Jun. 2, 2020.

*Primary Examiner* — Mathew Franklin Gordon
(74) *Attorney, Agent, or Firm* — IPUSA, PLLC

(57) ABSTRACT

A shovel includes an attachment attached to a revolving upper body; and a control device including a memory and a processor configured to execute estimating a center of gravity of loaded matter loaded in the attachment, and calculating a weight of the loaded matter based on the estimated center of gravity of the loaded matter.

14 Claims, 15 Drawing Sheets

(56) References Cited

U.S. PATENT DOCUMENTS

2020/0232189 A1   7/2020   Yamanobe et al.

FOREIGN PATENT DOCUMENTS

| JP | H06-010378 | 1/1994 |
| JP | H07-083740 | 3/1995 |
| JP | H09-256414 | 9/1997 |
| JP | H10-194698 | 7/1998 |
| JP | H11-230820 | 8/1999 |
| WO | 2019049774 | 3/2019 |

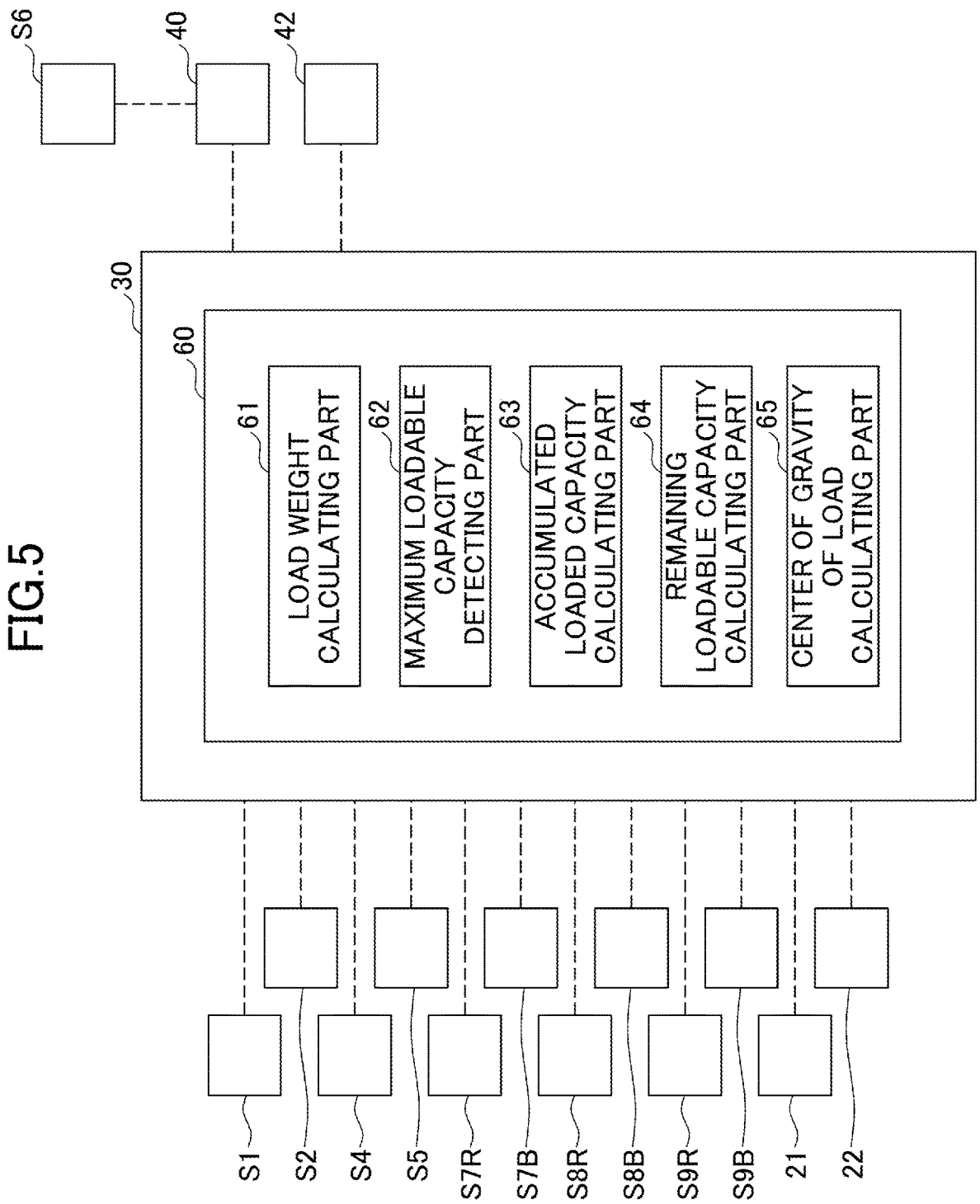

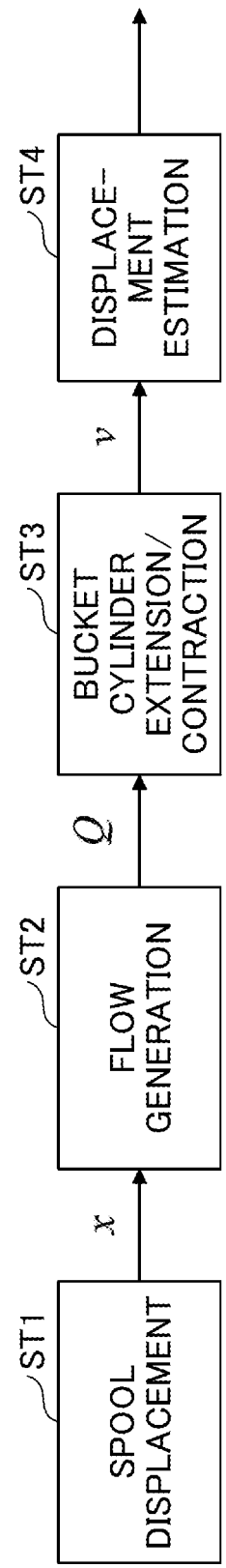

SHOVEL

CROSS-REFERENCE TO RELATED APPLICATION

The present application is a continuation application of International Application No. PCT/JP2020/014224 filed on Mar. 27, 2020, which is based on and claims priority to Japanese Patent Application No. 2019-069240, filed on Mar. 29, 2019. The contents of these applications are incorporated herein by reference in their entirety.

BACKGROUND

Technical Field

The present disclosure relates to a shovel.

For example, a shovel that includes a boom angle meter for detecting an angle between the boom and the upper body; an arm angle meter for detecting an angle between the boom and the arm; and a stroke meter for detecting the stroke of the bucket cylinder, and detects the weight of earth and sand in the bucket, is disclosed.

Meanwhile, as the number of sensors required to detect the weight of the earth and sand in the bucket increases, the cost of the shovel increases.

Therefore, it is desirable to provide a shovel that calculates the weight of the loaded matter with a reduced number of sensors.

SUMMARY

According to an embodiment of the present inventive concept, a shovel includes an attachment attached to a revolving upper body; and a control device including a memory and a processor configured to execute estimating a center of gravity of loaded matter loaded in the attachment, and calculating a weight of the loaded matter based on the estimated center of gravity of the loaded matter.

BRIEF DESCRIPTION OF THE DRAWINGS

FIG. 5 is a diagram schematically illustrating an example of part of the configuration related to a function of detecting load of earth and sand of the shovel according to the present embodiment;

FIG. 7 is a control flow diagram of an attachment;

DETAILED DESCRIPTION

In the following, embodiments for implementing the present inventive concept will be described with reference to the drawings.

According to an embodiment, a shovel that calculates the weight of the loaded matter with a reduced number of sensors can be provided.

[Overview of Shovel]

First, with reference to FIG. 1, an overview of a shovel 100 according to the present embodiment will be described.

Figure 1:
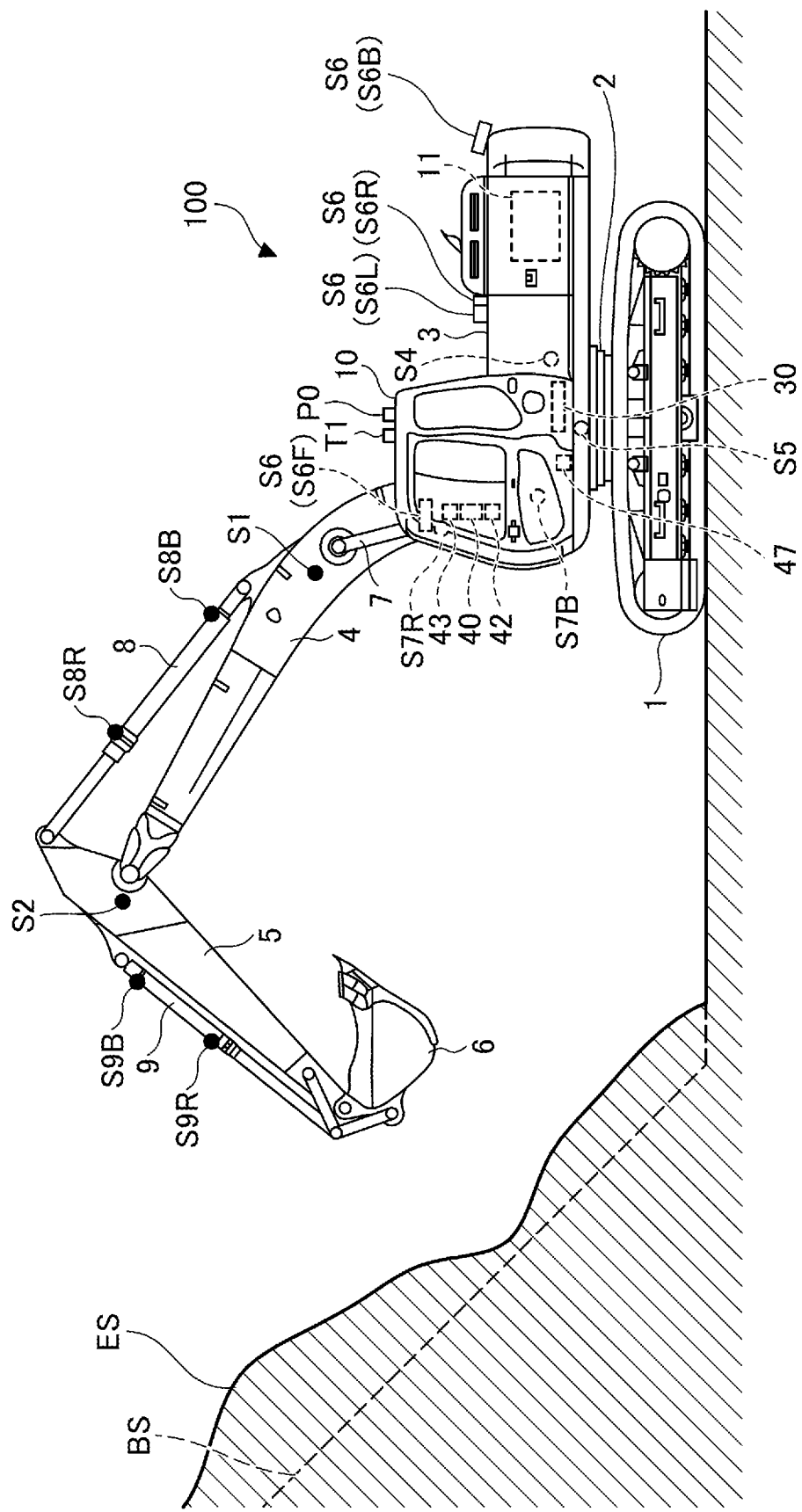
FIG. 1 is a side view of a shovel as an excavator according to a present embodiment.

FIG. 1 is a side view of the shovel 100 as an excavation machine according to the present embodiment.

Note that in FIG. 1, the shovel 100 is positioned on a horizontal surface in front of an upward tilt surface ES to be constructed; and in the figure, an upward slope surface BS (i.e., a shape of a slope surface to be formed after construction is completed on the upward tilt surface ES) is also illustrated as an example of a target construction surface that will be described later. Note that on the upward tilt surface ES to be constructed, a cylindrical body (not illustrated) is provided to indicate a direction normal to the upward slope surface BS as the target construction surface.

The shovel 100 according to the present embodiment is provided with a traveling lower body 1; a revolving upper body 3 mounted on the traveling lower body 1, to be capable of revolving via a revolution mechanism 2; a boom 4, an arm 5, and a bucket 6 constituting an attachment (machinery); and a cabin 10.

By having a pair of crawlers on the left and right hydraulically driven by hydraulic motors for traveling 1L and 1R (see FIG. 2 that will be described later), the traveling lower body 1 drives the shovel 100. In other words, the pair of hydraulic motors for traveling 1L and 1R (an example of a motor for traveling) drives the traveling lower body 1 (crawlers) as a driven part.

The revolving upper body 3 is driven by a hydraulic motor for revolution 2A (see FIG. 2 that will be described later), and revolves with respect to the traveling lower body 1. In other words, the hydraulic motor for revolution 2A is a revolution driving part to drive the revolving upper body 3 as a driven part, and can change the orientation of the revolving upper body 3.

Note that the revolving upper body 3 may be electrically driven by an electric motor (referred to as the "electric motor for revolution", hereafter), instead of the hydraulic motor for revolution 2A. In other words, like the hydraulic motor for revolution 2A, the electric motor for revolution is a revolution driving part to drive the revolving upper body 3 as a driven part, and can change the orientation of the revolving upper body 3.

The boom 4 is attached to the center of the front part of the revolving upper body 3, to be capable of being elevated; at the tip of the boom 4, the arm 5 is attached to be capable of rotating upward or downward; and at the tip of the arm 5, the bucket 6 as an end attachment is attached to be capable of rotating upward or downward. The boom 4, the arm 5, and the bucket 6 are hydraulically driven by a boom cylinder 7, an arm cylinder 8, and a bucket cylinder 9 as hydraulic actuators, respectively.

Note that the bucket 6 is an example of an end attachment, and at the tip of the arm 5, instead of the bucket 6, depending on the contents of work, another end attachment, such as a bucket for slope surface, a bucket for dredging, a breaker, or the like may be attached.

The cabin 10 is a cab boarded by the operator, and is mounted on the left side of the front part of the revolving upper body 3.

[Configuration of Shovel]

Next, with reference to FIG. 2 in addition to FIG. 1, a specific configuration of the shovel 100 according to the present embodiment will be described.

Figure 2:
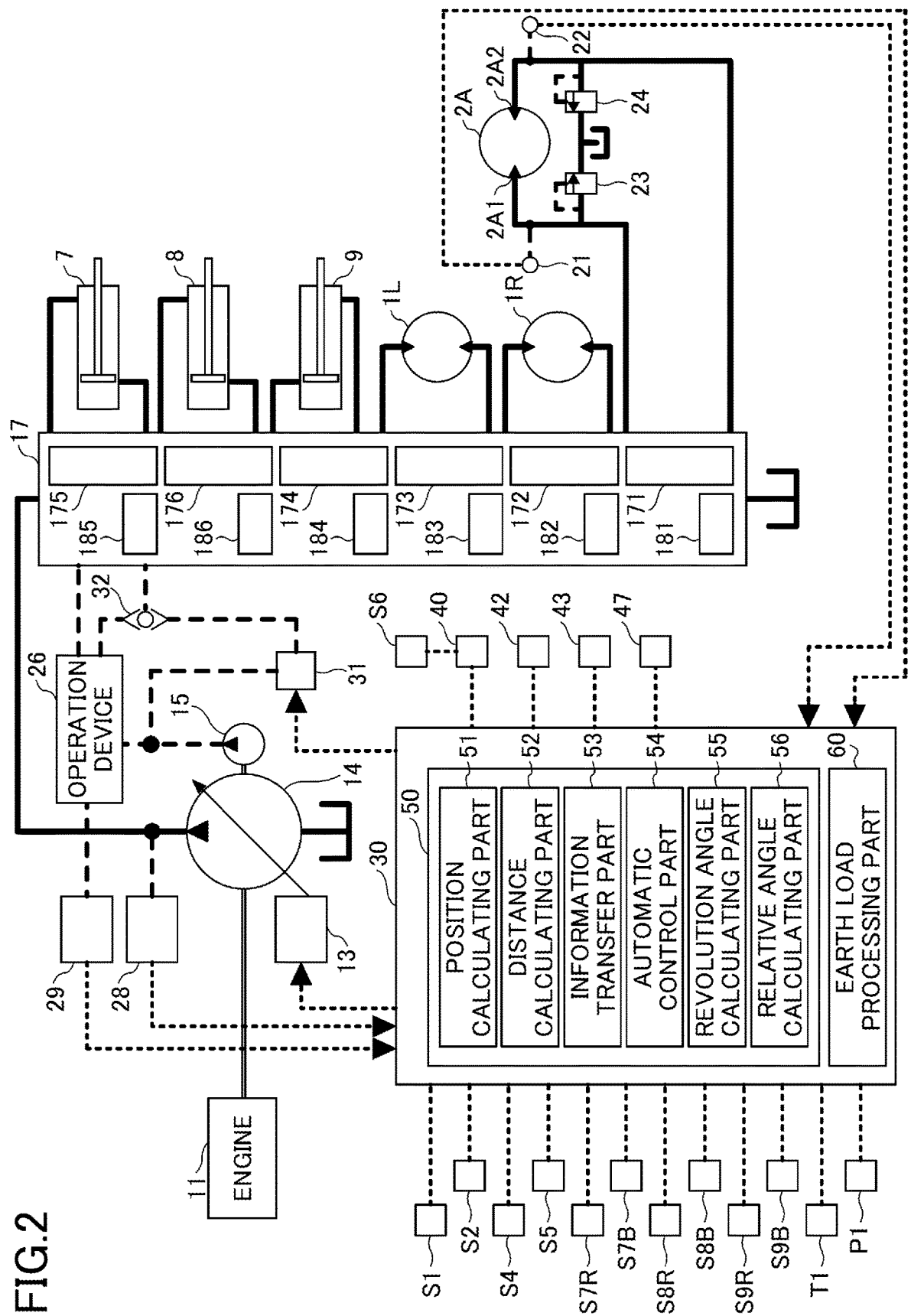
FIG. 2 is a schematic diagram illustrating an example of a configuration of the shovel according to the present embodiment.

FIG. 2 is a schematic diagram illustrating an example of a configuration of the shovel 100 according to the present embodiment.

Note that in FIG. 2, a mechanical power transmission system, hydraulic oil lines, pilot lines, and an electric control system are designated with double lines, solid lines, dashed lines, and dotted lines, respectively.

The driving system of the shovel 100 primarily according to the present embodiment includes an engine 11, regulators 13, main pumps 14, and control valves 17. Also, as described above, the hydraulic drive system of the shovel 100 according to the present embodiment includes hydraulic actuators including the hydraulic motors for traveling 1L and 1R, the hydraulic motor for revolution 2A, the boom cylinder 7, the arm cylinder 8, and the bucket cylinder 9, for hydraulically driving the traveling lower body 1, the revolving upper body 3, the boom 4, the arm 5, and the bucket 6, respectively.

The engine 11 is the main power source in the hydraulic drive system, and is installed, for example, in the rear part of the revolving upper body 3. Specifically, the engine 11 revolves at predetermined target revolutions per minute set in advance, to drive the main pumps 14 and the pilot pump 15, under direct or indirect control of the controller 30 that will be described later. The engine 11 is, for example, a diesel engine fueled with light oil.

The regulators 13 control the discharge amount of the main pumps 14. For example, in response to a control command from the controller 30, the regulators 13 adjust the angle of the swashplate (tilt angle) of the main pumps 14. The regulators 13 include, for example, regulators 13L and 13R as will be discussed later.

The main pumps 14, for example, like the engine 11, are mounted in the rear part of the revolving upper body 3, to supply hydraulic oil to the control valves 17 through high pressure hydraulic lines. As described above, the main pumps 14 are driven by the engine 11. Each of the main pumps 14 is, for example, a variable displacement hydraulic pump, and as described above, has the tilt angle of its swashplate adjusted by a regulator 13 under control of the controller 30; the stroke length of the piston is adjusted, and thereby, the discharge flow (discharge pressure) is controlled. The main pumps 14 include main pumps 14L and 14R, for example, as will be discussed later.

Each of the control valves 17 is a hydraulic control device that is installed, for example, in the center part of the revolving upper body 3 for controlling the hydraulic drive system in response to an operation performed on the operation device 26 by the operator. As described above, the control valves 17 are connected to the main pumps 14 via high pressure hydraulic lines, and selectively supply hydraulic oil supplied from the main pumps 14 to hydraulic actuators (the hydraulic motors for traveling 1L and 1R, the hydraulic motor for revolution 2A, the boom cylinder 7, the arm cylinder 8, and the bucket cylinder 9), depending on the operational state of the operation device 26. Specifically, the control valves 17 include control valves 171-176 for controlling the flow and the direction of hydraulic oil supplied from the main pumps 14 to the respective hydraulic actuators. More specifically, the control valve 171 corresponds to the hydraulic motor for traveling 1L; the control valve 172 corresponds to the hydraulic motor for traveling 1R; and the control valve 173 corresponds to the hydraulic motor for revolution 2A. Also, the control valve 174 corresponds to the bucket cylinder 9; the control valves 175 correspond to the boom cylinder 7; and the control valves 176 correspond to the arm cylinder 8. Also, for example, as will be discussed later, the control valves 175 include control valves 175L and 175R; and, for example, as will be discussed later, the control valves 176 include control valves 176L and 176R. The control valves 171-176 will be described in detail later.

The operation system of the shovel 100 according to the present embodiment includes the pilot pump 15 and the operation device 26. Also, the operation system of the shovel 100 includes shuttle valves 32 as elements related to a machine control function implemented by the controller 30 that will be described later.

The pilot pump 15 is installed, for example, in the rear part of the revolving upper body 3, to supply pilot pressure to the operation device 26 via pilot lines. The pilot pump 15 is, for example, a fixed-capacity hydraulic pump, and driven by the engine 11 as described above.

The operation device 26 is an operation input part provided around the cockpit in the cabin 10 for the operator to perform operations on various operating elements (the traveling lower body 1, the revolving upper body 3, the boom 4, the arm 5, the bucket 6, and the like). In other words, the operation device 26 is an operation input part for the operator to perform operations on the operating elements that drive the respective hydraulic actuators (i.e., the hydraulic motors for traveling 1L and 1R, the hydraulic motor for revolution 2A, the boom cylinder 7, the arm cylinder 8, and the bucket cylinder 9). The operation device 26 is connected to the control valves 17 directly via pilot lines on its secondary side, or indirectly via the shuttle valves 32 provided on the pilot lines on its secondary side, as will be described later. This enables the control valves 17 to receive as input pilot pressures depending on the operational states of the traveling lower body 1, the revolving upper body 3, the boom 4, the arm 5, the bucket 6, and the like in the operation device 26. Therefore, the control valves 17 can drive the respective hydraulic actuators depending on the operational state in the operation device 26. The operation device 26 includes, for example, a lever device to operate the arm 5 (the arm cylinder 8). Also, the operation device 26 includes, for example, lever devices 26A-26C to operate the boom 4 (the boom cylinder 7), the bucket 6 (the bucket cylinder 9), the revolving upper body 3 (the hydraulic motor for revolution 2A), respectively (see FIGS. 4A-4C). Also, the operation device 26 includes, for example, a lever device or a pedal device to operate each of the pair of crawlers on the left and right (the hydraulic motors for traveling 1L and 1R) of the traveling lower body 1.

Each shuttle valve 32 has two input ports and one output port, and among pilot pressures input into the two input port, outputs hydraulic oil having a higher pilot pressure to the output port. One of the two input ports of the shuttle valve 32 is connected to the operation device 26, and the other is connected to a corresponding proportional valve 31. Through the pilot line, the output port of the shuttle valve 32 is connected to the pilot port of a corresponding control valve in the control valves 17 (see FIGS. 4A-4C for details). Therefore, the shuttle valve 32 can cause a higher pressure among of the pilot pressure generated by the operation device 26 and the pilot pressure generated by the proportional valve 31, to work on the pilot port of the corresponding control valve. In other words, by outputting from the proportional valves 31 a pilot pressure higher than the pilot pressure on the secondary side output from the operation device 26, the controller 30 that will be described later can control the corresponding control valves, and control the operations of the various operating elements, regardless of an operation on the operation device 26 performed by the operator. For example, the shuttle valves 32 include shuttle valves 32AL, 32AR, 32BL, 32BR, 32CL, and 32CR as will be discussed later.

Note that the operation device 26 (a left operation lever, a right operation lever, a left traveling lever, and a right traveling lever) may be of an electric type that outputs an electrical signal, instead of a hydraulic pressure type that outputs pilot pressure. In this case, electrical signals from the operation device 26 are input into the controller 30, and depending on the input electrical signals, the controller 30 controls the corresponding control valves 171-176 among the control valves 17, to implement operations of the various hydraulic actuators according to the operational contents on the operation device 26. For example, each of the control valves 171-176 in the control valves 17 may be a solenoid spool valve driven by a command from the controller 30. Also, for example, between the pilot pump 15 and the pilot port of each of the control valve 171-176, a solenoid valve may be arranged that operates in response to an electrical signal from the controller 30. In this case, when a manual operation is performed using the electric operation device 26, the controller 30 controls the solenoid valve to increase or decrease the pilot pressure by an electrical signal corresponding to the amount of operation (e.g., the amount of lever operation), and thereby, can operate the corresponding control valves 171-176 according to the operational contents for the operation device 26.

The control valves 171-176 have spool displacement sensors 181-186 attached, respectively, for detecting the amount of displacement in each spool. For example, the spool displacement sensor 184 detects the amount of displacement in the spool of the control valve 174. Detection signals corresponding to the amounts of displacement in the spool detected by the respective spool displacement sensors 181-186 are taken into the controller 30.

The control system of the shovel 100 according to the present embodiment includes the controller 30, discharge pressure sensors 28, operational pressure sensors 29, proportional valves 31, a display device 40, an input device 42, a sound output device 43, a storage device 47, a boom angle sensor S1, an arm angle sensor S2, a machine tilt sensor S4, a revolution state sensor S5, an imaging device S6, a positioning device P0, and a communication device T1.

The controller 30 (an example of a control device) is provided, for example, in the cabin 10, and executes drive control of the shovel 100. Functions of the controller 30 may be implemented with any hardware components or software components, or combination of these. For example, the controller 30 is constituted primarily with a microcomputer that includes a CPU (Central Processing Unit), a ROM (Read-Only Memory), a RAM (Random Access Memory), a non-volatile auxiliary storage device, various input/output interfaces, and the like. The controller 30 implements various functions by, for example, the CPU executing various program stored, for example, in the ROM or the non-volatile auxiliary storage device.

For example, the controller 30 sets target revolutions per minute based on a work mode set in advance by a predetermined operation performed by the operator or the like, to execute drive control to revolve the engine 11 at a constant rate.

Also, for example, the controller 30 outputs a control command to the regulators 13 as required, to vary the amounts of discharge of the main pumps 14.

Also, for example, the controller 30 executes control related to, for example, a machine guidance function of guiding a manual operation of the shovel 100 performed by the operator through the operation device 26. Also, the controller 30 executes control related to, for example, a machine control function of automatically supporting a manual operation of the shovel 100 performed by the operator through the operation device 26. In other words, the controller 30 includes a machine guidance part 50 as a functional part for a machine guidance function and a machine control function. Also, the controller 30 includes an earth and sand load processing part 60 that will be described later.

Note that some of the functions of the controller 30 may be implemented by another controller (control devices). In other words, the functions of the controller 30 may be implemented in a way of being distributed among multiple controllers. For example, the machine guidance function and the machine control function may be implemented by a dedicated controller (a control device).

The discharge pressure sensors 28 detect the discharge pressures of the main pumps 14. Detection signals corresponding to the discharge pressures detected by the discharge pressure sensors 28 are taken into the controller 30. The discharge pressure sensors 28 include discharge pressure sensors 28L and 28R, for example, as will be discussed later.

As described above, each of the operational pressure sensors 29 detects a pilot pressure on the secondary side of the operation device 26. namely, the pilot pressure corresponding to the operational state (e.g., operational contents such as the operation direction and the amount of operation) related to each operating element in the operation device 26 (i.e. hydraulic actuator). Detection signals of pilot pressures corresponding to operational states of the traveling lower body 1, the revolving upper body 3, the boom 4, the arm 5, the bucket 6, and the like in the operation device 26 detected by the operational pressure sensors 29 are taken into the controller 30. The operational pressure sensors 29 include operational pressure sensors 29A-29C, for example, as will be discussed later.

Note that in place of the operational pressure sensors 29, other sensors capable of detecting operational states of the respective operating elements in the operation device 26, such as an encoder or potentiometer capable of detecting the amount of operation (tilt amount), the tilt direction, and the like of the lever devices 26A-26C, may be provided.

The proportional valves 31 are provided on pilot lines connecting the pilot pump 15 to the shuttle valves 32, and are configured to be capable of changing the flow area (cross sectional area through which hydraulic oil can flow). Each of the proportional valves 31 operates in response to a control command input from the controller 30. This enables, even in the case where the operation device (specifically, any of the lever devices 26A-26C) is not being operated by the operator, the controller 30 to provide hydraulic oil discharged from the pilot pump 15 to the pilot port of a corresponding control valve among the control valves 17 via the proportional valves 31 and the shuttle valves 32. The proportional valves 31 include, for example, proportional valves 31AL and 31AR, 31BL, 31BR, 31CL, and 31CR, as will be discussed later.

The display device 40 is provided at a location readily visible from the operator seated in the cabin 10, to display various informative images under control of the controller 30. The display device 40 may be connected to the controller 30 via a communication network such as a CAN (Controller Area Network), or may be connected to the controller 30 via dedicated one-to one lines.

The input device 42 is provided within a range reachable by hand by the operator seated in the cabin 10, to receive various operation inputs by the operator, and to output signals according to the operation inputs to the controller 30. The input device 42 includes a touch panel mounted on a display of a display device to display various informative images, a knob switch provided at the tip of a lever part of each of the lever devices 26A-26C, a button switch, a lever, a toggle, a rotary dial, and the like, arranged around the display device 40. Signals corresponding to the operational contents on the input device 42 are taken into the controller 30.

The sound output device 43 is provided, for example, in the cabin 10, connected to the controller 30, and configured to output sound under control of the controller 30. The sound output device 43 is, for example, a speaker, a buzzer, or the like. The sound output device 43 outputs various items of information by sound in response to sound output commands from the controller 30.

The storage device 47 is provided, for example, in the cabin 10, and configured to store various items of information under control of the controller 30. The storage device 47 is, for example, a non-volatile storage medium such as a semiconductor memory. The storage device 47 may store information output by various devices during operations of the shovel 100, and may store information obtained via the various devices before operations of the shovel 100 is started. The storage device 47 may store, for example, data related to a target construction surface that is obtained via the communication device T1 or the like, or set through the input device 42 or the like. The target construction surface may be set (stored) by the operator of the shovel 100, or may be set by a construction manager or the like.

The boom angle sensor S1 is attached to the boom 4, to detect an elevation angle of the boom 4 with respect to the revolving upper body 3 (referred to as the "boom angle", hereafter), for example, in a side view, an angle formed by a line connecting the supporting points at both ends of the boom 4, with respect to a revolution plane of the revolving upper body 3. The boom angle sensor S1 may include, for example, a rotary encoder, an acceleration sensor, a hexaxial sensor, an IMU (Inertial Measurement Unit), and the like. Also, the boom angle sensor S1 may include a potentiometer using a variable resistor, a cylinder sensor to detect the stroke amount of a hydraulic cylinder (the boom cylinder 7) corresponding to the boom angle, and the like. In the following, the same applies to the arm angle sensor S2. A detection signal corresponding to the boom angle detected by the boom angle sensor S1 is taken into the controller 30.

The arm angle sensor S2 is attached to the arm 5, to detect an angle of rotation of the arm 5 with respect to the boom 4 (referred to as the "arm angle", hereafter), for example, in a side view, an angle formed by a line connecting the supporting points at both ends of the boom 4, with respect to a line connecting the supporting points at both ends of the arm 5. A detection signal corresponding to the arm angle detected by the arm angle sensor S2 is taken into the controller 30.

Note that the shovel 100 according to the present embodiment eliminates the need for a bucket angle sensor that would be attached to the bucket 6, to detect the angle of rotation with respect to arm 5 of the bucket 6 (referred to as the "bucket angle", hereafter), for example, in a side view, an angle formed by a line connecting the supporting point of the bucket 6 and the tip (blade edge), with respect to a line connecting the supporting points at both ends of the arm 5.

The machine tilt sensor S4 detects the tilt state of a body (the revolving upper body 3 or the traveling lower body 1), for example, with respect to the horizontal plane. The machine tilt sensor S4 is attached to, for example, the revolving upper body 3, to detect biaxial tilt angles (referred to as the "back-and-forth tilt angle" and the "left-and-right tilt angle", hereafter) of the shovel 100 (i.e., the revolving upper body 3) in the back-and-forth direction and in the left-and-right direction. The machine tilt sensor S4 may include, for example, a rotary encoder, an acceleration sensor, a hexaxial sensor, an IMU, and the like. Detection signals corresponding to the tilt angles (the back-and-forth tilt angle and the left-and-right tilt angle) by the machine tilt sensor S4 are taken into the controller 30.

The revolution state sensor S5 outputs detected information on the revolution state of the revolving upper body 3. The revolution state sensor S5 detects, for example, the revolutional angular velocity and the revolution angle of the revolving upper body 3. The revolution state sensor S5 may include, for example, a gyro sensor, a resolver, a rotary encoder, and the like. Detection signals corresponding to the revolution angle and the revolution angular velocity of the revolving upper body 3 detected by the revolution state sensor S5 are taken into the controller 30.

The imaging device S6 as a space recognition device captures images in the surroundings of the shovel 100. The imaging device S6 includes a camera S6F to capture an image of a space in front of the shovel 100; a camera S6L to capture an image of a space on the left of the shovel 100; a camera S6R to capture an image of a space on the right of the shovel 100; and a camera S6B to capture an image of a space behind the shovel 100.

The camera S6F is attached, for example, to the ceiling of the cabin 10, namely, to the inside of the cabin 10. Alternatively, the camera S6F may be attached to the outside of the cabin 10, such as the roof of the cabin 10 or a side surface of the boom 4. The camera S6L is attached to the left end on the top surface of the revolving upper body 3; the camera S6R is attached to the right end on the top surface of the revolving upper body 3; and the camera S6B is attached to the rear end on the top surface of the revolving upper body 3.

The imaging device S6 (or each camera S6F, S6B, S6L, or S6R) is, for example, a monocular wide angle camera having a very wide angle of field. Also, the imaging device S6 may be a stereo camera, a distance image camera, or the like. An image captured by the imaging device S6 is taken into the controller 30, via the display device 40.

The imaging device S6 as the space recognition device may function as an object detection device. In this case, the imaging device S6 may detect an object present in the surroundings of the shovel 100. The object to be detected includes, for example, a person, an animal, a vehicle, a construction machine, a building, a hole, and the like. Also, the imaging device S6 may calculate the distance from the imaging device S6 or the shovel 100 to the recognized object. The imaging device S6 as an object detecting device may include, for example, a stereo camera, a depth image camera, and a the like. Further, the space recognition device is, for example, a monocular camera having an imaging element such as a CCD or CMOS, and outputs a captured image to the display device 40. Also, the space recognition device may be configured to calculate the distance from the space recognition device or the shovel 100 to the recognized object. Also, in addition to the imaging device S6, as the space recognition device, other object detection devices such as an ultrasonic sensor, a millimeter wave radar, a LIDAR device, an infrared sensor, and the like, may be provided. In the case of using a millimeter-wave radar, ultrasonic sensor, laser radar, or the like as the space recognition device, such a sensor may transmit a number of signals (such as laser light rays) to an object, to receive the reflected signals, so as to detect the distance and the direction of the object from the reflected signals.

Note that the imaging device S6 may be communicably connected directly to the controller 30.

A boom rod pressure sensor S7R and a boom bottom pressure sensor S7B are attached to the boom cylinder 7. An arm rod pressure sensor S8R and an arm bottom pressure sensor S8B are attached to the arm cylinder 8. A bucket rod pressure sensor S9R and a bucket bottom pressure sensor S9B are attached to the bucket cylinder 9. The boom rod pressure sensor S7R, the boom bottom pressure sensor S7B, the arm rod pressure sensor S8R, the arm bottom pressure sensor S8B, the bucket rod pressure sensor S9R, the bucket bottom pressure sensor S9B are also collectively referred to as the "cylinder pressure sensors".

The boom rod pressure sensor S7R detects the pressure of the oil chamber on the rod side of the boom cylinder 7 (hereafter, referred to as the "boom rod pressure"), and the boom bottom pressure sensor S7B detects the pressure of the oil chamber on the bottom side of the boom cylinder 7 (hereafter, referred to as the "boom bottom pressure"). The arm rod pressure sensor S8R detects the pressure of the oil chamber on the rod side of the arm cylinder 8 (hereafter, referred to as the "arm rod pressure"), and the arm bottom pressure sensor S8B detects the pressure of the oil chamber on the bottom side of the arm cylinder 8 (hereafter, referred to as the "arm bottom pressure"). The bucket rod pressure sensor S9R detects the pressure of the oil chamber on the rod side of the bucket cylinder 9 (hereafter, referred to as the "bucket rod pressure"), and the bucket bottom pressure sensor S9B detects the pressure of the oil chamber on the bottom side of the bucket cylinder 9 (hereafter, referred to as the "bucket bottom pressure").

The positioning device P0 measures the position and the orientation of the revolving upper body 3. The positioning device P0 is, for example, a GNSS compass (Global Navigation Satellite System) to detect the position and the orientation of the revolving upper body 3, and detection signals corresponding to the position and the orientation of the revolving upper body 3 are taken into the controller 30. Also, the function of detecting the orientation of the revolving upper body 3 among the functions of the positioning device P0 may be replaced by an orientation sensor attached to the revolving upper body 3.

The communication device T1 communicates with an external device through a predetermined network including a mobile communication network having base stations at the ends, a satellite communication network, the Internet, and the like. The communication device T1 is, for example, a mobile communication module compliant with mobile communication standards such as LTE (Long Term Evolution), 4G (4th Generation), and 5G (5th Generation), a satellite communication module for connecting to a satellite communication network, or the like.

The machine guidance part 50, for example, executes control of the shovel 100 related to the machine guidance function. The machine guidance part 50 transmits working information, for example, the distance between the target construction surface and the tip of the attachment, specifically, a working part of the end attachment and the like to the operator through the display device 40, the sound output device 43, and the like. Data related to the target construction surface is stored in advance in the storage device 47, for example, as described above. The data related to the target construction surface is represented, for example, in a reference coordinate system. The reference coordinate system is, for example, the World Geodetic System. The World Geodetic System is a three-dimensional orthogonal XYZ coordinate system that has the origin at the center of gravity of the Earth, the X-axis in the direction of the intersection of the Greenwich meridian and the equator, the Y-axis in the direction of longitude 90 degrees east, and the Z-axis in the direction of the North Pole. The operator may define any point on the construction site as the reference point, to set the target construction surface through the input device 42 in a relative positional relationship with respect to the reference point. The working part of the bucket 6 is, for example, the teeth end of the bucket 6, the back face of the bucket 6, or the like. Also, as the end attachment, instead of the bucket 6, for example, in the case of adopting a breaker, the tip of the breaker corresponds to the working part. The machine guidance part 50 informs the operator of the operation information through the display device 40, the sound output device 43, and the like, to guide operations of the shovel 100 performed by the operator through the operation device 26.

Also, the machine guidance part 50, for example, executes control of the shovel 100 related to the machine guidance function. For example, when the operator is performing an excavation operation manually, the machine guidance part 50 may cause at least one of the boom 4, the arm 5, and the bucket 6 to operate automatically, so as to have the tip position of the bucket 6 coincident with the target construction surface.

The machine guidance part 50 obtains information from the boom angle sensor S1, the arm angle sensor S2, the machine tilt sensor S4, the revolution state sensor S5, the imaging device S6, the positioning device P0, the communication device T1, and the input device 42. Then, for example, based on the obtained information, the machine guidance part 50 calculates the distance between the bucket 6 and the target construction surface; informs the operator of the degree of the distance between the bucket 6 and the target construction surface, through a sound from the sound output device 43 and an image displayed on the display device 40; and controls the operation of the attachment automatically, so as to have the tip of the attachment (specifically, the working part such as the teeth end or the back face of the bucket 6) coincident with the target construction surface. The machine guidance part 50 includes a position calculating part 51, a distance calculating part 52, an information transfer part 53, an automatic control part 54, a revolution angle calculating part 55, and a relative angle calculating part 56, as detailed functional elements related to the machine guidance function and the machine control function.

The position calculating part 51 calculates the position of a predetermined positioning target. For example, the position calculating part 51 calculates the coordinate point of the tip of the attachment, specifically, the working part such as the teeth end or the back face of the bucket 6, in the reference coordinate system. Specifically, the position calculating part 51 calculates the coordinate point of the working part of the bucket 6 from the respective elevation angles (the boom angle, the arm angle, and the bucket angle) of the boom 4, the arm 5, and the bucket 6.

The distance calculating part 52 calculates the distance between two positioning targets. For example, the distance calculating part 52 calculates the distance between the tip of the attachment, specifically, the working part such as the teeth end or the back face of the bucket 6, and the target construction surface. Also, the distance calculating part 52 may calculate an angle (a relative angle) between the back face as the working part for the bucket 6, and the target construction surface.

The information transfer part 53 transfers (notifies) various information items to the operator of the shovel 100 through a predetermined notification part such as the display device 40 and the sound output device 43. The information transfer part 53 notifies the magnitude (degree) of the various distances and the like calculated by the distance calculating part 52, to the operator of the shovel 100. For example, by using at least one of visual information provided by the display device 40, and auditory information provided by the sound output device 43, the information transfer part 53 transmits (the magnitude of) the distance between the tip of the bucket 6 and the target construction surface to the operator. Also, by using at least one of visual information provided by the display device 40, and auditory information provided by the sound output device 43, the information transfer part 53 may transmit (the magnitude of) the relative angle between the back face as the working part for the bucket 6, and the target construction surface, to the operator.

Specifically, the information transfer part 53 uses intermittent noise generated by the sound output device 43, to transmit the magnitude of the distance (e.g., vertical distance) between the working part of the bucket 6 and the target construction surface, to the operator. In this case, the information transfer part 53 may shorten the interval of the intermittent noise as the vertical distance becomes shorter, and lengthen the interval of the intermittent noise as the vertical distance becomes longer. Also, the information transfer part 53 may use a continuous sound, or may express difference in the magnitude of the vertical distance while varying the pitch, intensity, and the like of the sound. Also, in the case where the tip of the bucket 6 comes lower than the target construction surface, namely, exceeds the target construction surface, the information transfer part 53 may issue an alarm through the sound output device 43. The alarm is, for example, a continuous sound that is significantly greater than the intermittent noise.

Also, the information transfer part 53 may cause the display device 40 to display the magnitude of the distance between the tip of the attachment, specifically, a working part of the bucket 6, and the target construction surface, and the magnitude of the relative angle between the back face of the bucket 6 and the target construction surface, as working information. The display device 40 displays the working information received from the information transfer part 53, for example, together with image data received from the imaging device S6, under control of the controller 30. The information transfer part 53 may use, for example, an image of an analog meter, an image of a bar graph indicator, or the like, to transmit the magnitude of the vertical distance to the operator.

The automatic control part 54 is configured to automatically support a manual operation of the shovel 100 performed by the operator, by causing the actuators to operate automatically. Specifically, as will be discussed later, the automatic control part 54 can adjust pilot pressure working on the control valves (specifically, the control valves 173, 175L, 175R, and 174) corresponding to the multiple hydraulic actuators (specifically, the hydraulic motor for revolution 2A, the boom cylinder 7, and the bucket cylinder 9) independently and automatically. This enables the automatic control part 54 to cause each of the hydraulic actuator to operate automatically. The control related to the machine control function by the automatic control part 54 may be executed, for example, when a predetermined switch included in the input devices 42 is pressed. The predetermined switch may be, for example, a machine control switch (hereafter, referred to as the "MC switch") arranged as a knob switch at the tip of the operation device 26 to be gripped by the operator (e.g., a lever device corresponding to the operation of the arm 5). It is assumed in the following description that that the machine control function is enabled while the MC switch is being pressed.

For example, in the case where the MC switch or the like is being pressed, in order to assist excavation word or shaping work, the automatic control part 54 causes at least one of the boom cylinder 7 and the bucket cylinder 9 to extend or contract automatically according to the operation of the arm cylinder 8. Specifically, in the case where the operator manually performs a closing operation of the arm 5 (referred to as the "arm closing operation", hereafter), the automatic control part 54 causes at least one of the boom cylinder 7 and the bucket cylinder 9 to extend or contract automatically, so as to have the target construction surface coincident with the position of the working part such as the teeth end, the back face, or the like of the bucket 6. In this case, for example, by simply operating the lever device corresponding to the operation of the arm 5, the operator can close the arm 5 while having the teeth end or the like of the bucket 6 coincident with the target construction surface.

Also, in the case where the MC switch is being pressed, in order to cause the revolving upper body 3 to face the target construction surface, the automatic control part 54 may cause the hydraulic motor for revolution 2A (an example of an actuator) to revolve automatically. In the following, the control executed by the controller 30 (the automatic control part 54) to cause the revolving upper body 3 to face the target construction surface, will be referred to as "facing control". This allows the operator or the like to cause the revolving upper body 3 to face the target construction surface, by simply pressing a predetermined switch, or operating the lever device 26C that will be described later, corresponding to the revolution operation in a state of the switch being pressed. Also, by simply pressing the MC switch, the operator can cause the revolving upper body 3 to face the target construction surface, and initiate the machine control function related to excavation work of the target construction surface described above.

For example, the state of the revolving upper body 3 of the shovel 100 facing the target construction surface is a state in which the tip of the attachment (e.g., the teeth end, the back face, or the like as the working part of the bucket 6) can be moved along the tilt direction of the target construction surface (the upward slope surface BS) according to operations of the attachment. Specifically, the state of the revolving upper body 3 of the shovel 100 facing the target construction surface is a state in which the working face of the attachment (the working attachment face) vertical to the revolution plane of the shovel 100 includes a normal to the target construction surface corresponding to the cylindrical body (i.e., a state of extending along the normal).

In the case where the working attachment face of the shovel 100 is not in a state of including the normal to the target construction surface corresponding to the cylindrical body, the tip of the attachment cannot be moved to the target construction surface in the tilt direction. Therefore, as a result, the shovel 100 cannot execute construction on the target construction surface. In contrast, by causing the hydraulic motor for revolution 2A to revolve automatically, the automatic control part 54 can cause the revolving upper body 3 to face the target construction surface. Accordingly, the shovel 100 can execute construction work on the target construction surface.

In the facing control, the automatic control part 54 determines that the shovel faces the target construction surface, for example, in the case where a left end vertical distance between the coordinate point of the left end on the teeth end of the bucket 6 and the target construction surface (simply referred to as the "left end vertical distance", hereafter) becomes equal to a right end vertical distance between the coordinate point of the right end on the teeth end of the bucket 6 and the target construction surface (simply referred to as the "right end vertical distance", hereafter). Also, not in the case where the left end vertical distance becomes equal to the right end vertical distance (i.e., in the case where the difference between the left end vertical distance and the right end vertical distance becomes zero), or in the case where the difference becomes less than or equal to a predetermined value, the automatic control part 54 may determine that the shovel 100 faces the target construction surface.

Also, in the facing control, the automatic control part 54 may cause the hydraulic motor for revolution 2A to operate, for example, based on the difference between the left end vertical distance and the right end vertical distance. Specifically, when the lever device 26C corresponding to the revolution operation is operated in a state of the predetermined switch such as the MC switch is being pressed, the automatic control part 54 determines whether or not the lever device 26C is operated in a direction in which the revolving upper body 3 comes to face the target construction surface. For example, in the case where the lever device 26C is operated in a direction in which the vertical distance between the teeth end of the bucket 6 and the target construction surface (the upward slope surface BS) becomes greater, the automatic control part 54 does not execute the facing control. On the other hand, in the case where the lever device 26C is operated in a direction in which the vertical distance between the teeth end of the bucket 6 and the target construction surface (the upward slope surface BS) becomes smaller, the automatic control part 54 executes the facing control. As a result, the automatic control part 54 can cause the hydraulic motor for revolution 2A to operate so as to make the difference between the left end vertical distance and the right end vertical distance smaller. Thereafter, once the difference becomes less than or equal to the predetermined value or zero, the automatic control part 54 stops the hydraulic motor for revolution 2A. Also, the automatic control part 54 may control the operation of the hydraulic motor for revolution 2A, by setting a revolution angle at which the difference is less than or equal to the predetermined value or zero as the target angle, making the angle difference between the target angle and the current revolution angle (specifically, a detected value based on a detection signal of the revolution state sensor S5) become zero. In this case, the revolution angle is, for example, an angle of the back-and-forth axis of the revolving upper body 3 with respect to a reference direction.

Note that as described above, instead of the hydraulic motor for revolution 2A, in the case where an electric motor for revolution is installed in the shovel 100, the automatic control part 54 executes the facing control with respect to the electric motor for revolution (an example of an actuator) as the control target.

The revolution angle calculating part 55 calculates the revolution angle of the revolving upper body 3. This enables the controller 30 to identify the current orientation of the revolving upper body 3. The revolution angle calculating part 55 calculates the angle of the back-and-forth axis of the revolving upper body 3 with respect to the reference direction as the revolution angle, based on, for example, the output signal of the GNSS compass included in the positioning device P0. Also, the revolution angle calculating part 55 may calculate the revolution angle based on the detection signal of the revolution state sensor S5. Also, in the case where a reference point is set at the construction site, the revolution angle calculating part 55 may set a direction of viewing the reference point from the revolution axis, as the reference direction.

The revolution angle indicates a direction in which the working attachment face extends with respect to the reference direction. The working attachment face is, for example, a virtual plane extending over the attachment, and is arranged to be perpendicular to the revolution plane. The revolution plane is a virtual plane that includes, for example, a bottom surface of the revolution frame perpendicular to the revolution axis. For example, in the case where it is determined that the working attachment face contains the normal to the target construction surface, the controller 30 (the machine guidance part 50) determines that the revolving upper body 3 faces the target construction surface.

The relative angle calculating part 56 calculates the revolution angle (relative angle) required to cause the revolving upper body 3 to face the target construction surface. The relative angle is a relative angle formed, for example, between a direction of the back-and-forth axis of the revolving upper body 3 when the revolving upper body 3 faces the target construction surface, and the current direction of the back-and-forth axis of the revolving upper body 3. The relative angle calculating part 56 calculates the relative angle based on, for example, the data related to the target construction surface stored in the storage device 47, and the revolution angle calculated by the revolution angle calculating part 55.

When the lever device 26C corresponding to the revolution operation is operated in a state of the predetermined switch such as the MC switch is being pressed, the automatic control part 54 determines whether or not the revolution is operated in a direction that causes the revolving upper body 3 to come to face the target construction surface. In the case where it is determined that a revolution operation is executed in the direction in which revolving upper body 3 comes to face the target construction surface, the automatic control part 54 sets the relative angle calculated by the relative angle calculating part 56 as the target angle. Then, in the case where the change in the revolution angle after the lever device 26C was operated reaches the target angle, the automatic control part 54 may determine that the revolving upper body 3 faces the target construction surface, to stop the motion of the hydraulic motor for revolution 2A. This enables the automatic control part 54 to cause the revolving upper body 3 to face the target construction surface, assuming the configuration illustrated in FIG. 2. In the application example of the facing control described above, although cases of the facing control on the target construction surface are shown, the application is not limited as such. For example, in a scoop-up operation executed when loading temporarily placed earth and sand into a dump truck DT (see FIG. 12), the facing control may be applied to the revolution operation, by generating a target excavation trajectory corresponding to a target volume, and causing the attachment to face the target excavation trajectory. In this case, the target excavation trajectory is changed each time a scoop-up operation is completed. Therefore, after discharging the ES into the dump truck DT, the facing control is executed with respect to the new target excavation trajectory.

Also, the hydraulic motor for revolution 2A has a first port 2A1 and a second port 2A2. A hydraulic sensor 21 detects pressure of hydraulic oil working on the first port 2A1 of the hydraulic motor for revolution 2A. A hydraulic sensor 22 detects pressure of hydraulic oil working on the second port 2A2 of the hydraulic motor for revolution 2A. Detection signals corresponding to the discharge pressures detected by the hydraulic sensors 21 and 22 are taken into the controller 30.

Also, the first port 2A1 is connected to the hydraulic oil tank via a relief valve 23. The relief valve 23 opens in the case where the pressure on the first port 2A1 side reaches a predetermined relief pressure, to discharge the hydraulic oil on the first port 2A1 side to the hydraulic oil tank. Similarly, the second port 2A2 is connected to the hydraulic oil tank via a relief valve 24. The relief valve 24 opens in the case where the pressure on the second port 2A2 side reaches a predetermined relief pressure, to discharge the hydraulic oil on the second port 2A2 side to the hydraulic oil tank.

[Hydraulic System of Shovel]

Next, with reference to FIG. 3, the hydraulic system of the shovel 100 according to the present embodiment will be described.

Figure 3:
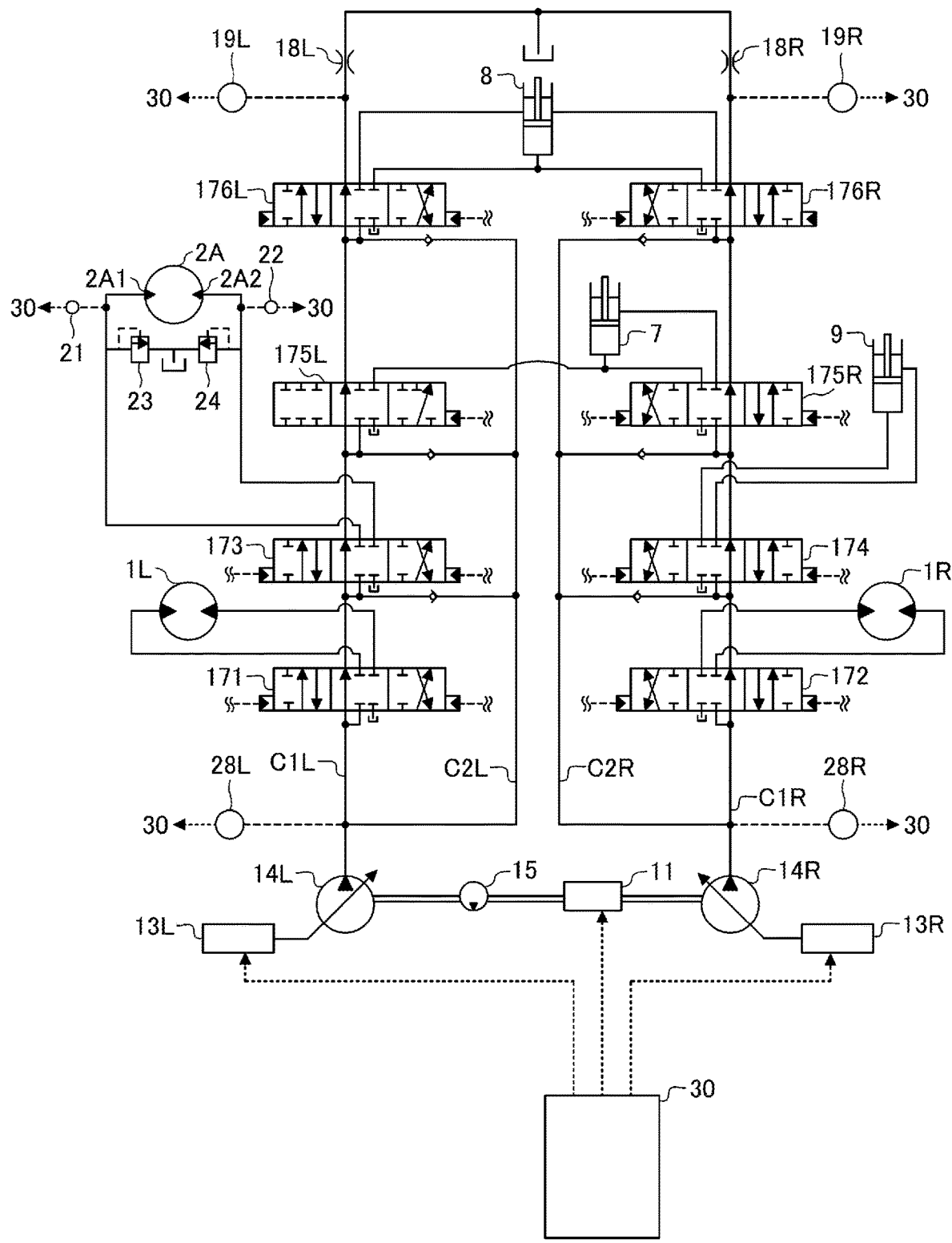
FIG. 3 schematically illustrates an example of a configuration of a hydraulic system of the shovel according to the present embodiment.

FIG. 3 schematically illustrates an example of a configuration of the hydraulic system of the shovel 100 according to the present embodiment.

Note that in FIG. 3, a mechanical power transmission system, hydraulic oil lines, pilot lines, and an electric control system are designated with double lines, solid lines, dashed lines, and dotted lines, respectively, as in the case of FIG. 2.

The hydraulic system implemented by the hydraulic circuit circulates hydraulic oil from the main pumps 14L and 14R driven by the engine 11, through center bypass oil paths C1L and C1R, and parallel oil paths C2L and C2R respectively, to the hydraulic oil tank.

The center bypass oil path C1L starts at the main pump 14L, passes through the control valves 171, 173, 175L, and 176L arranged in the control valves 17 in this order, and reaches the hydraulic oil tank.

The center bypass oil path C1R starts at the main pump 14R, passes through the control valves 172, 174, 175R, and 176R arranged in the control valves 17 in this order, and reaches the hydraulic oil tank.

The control valve 171 is a spool valve that supplies hydraulic oil discharged from the main pump 14L to the hydraulic motor for traveling 1L, and discharges the hydraulic oil discharged by the hydraulic motor for traveling 1L to the hydraulic oil tank.

The control valve 172 is a spool valve that supplies hydraulic oil discharged from the main pump 14R to the hydraulic motor for traveling 1R, and discharges the hydraulic oil discharged by the hydraulic motor for traveling 1R to the hydraulic oil tank.

The control valve 173 is a spool valve that supplies hydraulic oil discharged from the main pump 14L to the hydraulic motor for revolution 2A, and discharges the hydraulic oil discharged by the hydraulic motor for revolution 2A to the hydraulic oil tank.

The control valve 174 is a spool valve that supplies hydraulic oil discharged from the main pump 14R to the bucket cylinder 9, and discharges the hydraulic oil in the bucket cylinder 9 to the hydraulic oil tank.

The control valves 175L and 175R are spool valves that supply hydraulic oil discharged from the main pumps 14L and 14R, respectively, to the boom cylinder 7, and discharge the hydraulic oil in the boom cylinder 7 to the hydraulic oil tank.

The control valves 176L and 176R supply hydraulic oil discharged from the main pumps 14L and 14R, respectively, to the arm cylinder 8, and discharge the hydraulic oil in the arm cylinder 8 to the hydraulic oil tank.

Each of the control valves 171, 172, 173, 174, 175L, 175R, 176L, and 176R adjusts the flow of hydraulic oil supplied and discharged with respect to a corresponding hydraulic actuator, and changes the direction of the flow, depending on the pilot pressure working on the pilot port.

In parallel to the center bypass oil path C1L, the parallel oil path C2L supplies hydraulic oil of the main pump 14L to the control valves 171, 173, 175L, and 176L. Specifically, the parallel oil path C2L branches off from the center bypass oil path C1L on the upstream side of the control valves 171, and is configured to be capable of supplying hydraulic oil of the main pump 14L to the control valves 171, 173, 175L, and 176R in parallel. This enables the parallel oil path C2L to supply hydraulic oil to a control valve located on the downstream side, in the case where the flow of hydraulic oil through the center bypass oil path C1L is restricted or cut off by any of the control valves 171, 173, and 175L.

In parallel to a center bypass oil path C1R, the parallel oil path C2R supplies hydraulic oil of the main pump 14R to the control valves 172, 174, 175R, and 176R. Specifically, the parallel oil path C2R branches off from the center bypass oil path C1R on the upstream side of the control valves 172, and is configured to be capable of supplying hydraulic oil of the main pump 14R to the control valves 172, 174, 175R, and 176R in parallel. The parallel oil path C2R can supply hydraulic oil to a control valve located on the downstream side, in the case where the flow of hydraulic oil through the center bypass oil path C1R is restricted or cut off by any of the control valves 172, 174, and 175R.

The regulators 13L and 13R adjust the amounts of discharge of the main pump 14L and 14R by adjusting the tilting angles of the swash plates of the main pumps 14L and 14R, respectively, under control of the controller 30.

The discharge pressure sensor 28L detects the discharge pressure of the main pumps 14L, and a detection signal corresponding to the detected discharge pressure is taken into the controller 30. The same applies to the discharge pressure sensor 28R. This enables the controller 30 to control the regulators 13L and 13R in response to the discharge pressures of the main pumps 14L and 14R.

Along the center bypass oil paths C1L and C1R, between each of the control valves 176L and 176R at most downstream locations and the hydraulic oil tank, negative control throttles 18L and 18R are provided (referred to as the "negative control throttles", hereafter). With this configuration, the flow of hydraulic oil discharged by the left main pumps 14L and 14R is restricted by the negative-control throttles 18L and 18R. In addition, the negative-control throttles 18L and 18R generate control pressures for controlling the regulators 13L and 13R (referred to as the "negative-control pressures", hereafter)

The negative-control pressure sensor 19L and 19R detect the negative-control pressures, and detection signals corresponding to the detected negative control pressures are taken into the controller 30.

The controller 30 may control the regulators 13L and 13R according to the discharge pressures of the main pumps 14L and 14R detected by the discharge pressure sensors 28L and 28R, to adjust the amounts of discharge of the main pumps 14L and 14R. For example, the controller 30 may control the regulator 13L in response to an increase of the discharge pressure of the main pump 14L, to adjust the tilt angle of the swashplate of the main pump 14L, so as to reduce the discharge amount. The same applies to the regulator 13R. This enables the controller 30 to execute full horsepower control such that the absorbed horsepower of the main pumps 14L and 14R, which is expressed by a product of the discharge pressure and the discharge volume, so as not exceed the output horsepower of the engine 11.

Also, the controller 30 may adjust the amounts of discharge of the main pumps 14L and 14R, by controlling the regulators 13L and 13R according to the negative control pressures detected by the negative control pressure sensors 19L and 19R. For example, the controller 30 reduces the amounts of discharge of the main pumps 14L and 14R as the negative control pressures increase, and increases the amounts of discharge of the main pumps 14L and 14R as the negative control pressures decrease.

Specifically, in the case of a standby state in which none of the hydraulic actuators in the shovel 100 is operated (a state illustrated in FIG. 3), the hydraulic oil discharged from the main pumps 14L and 14R passes through the center bypass oil paths C1L and C1R, and reaches the negative control throttles 18L and 18R. Then, the flow of the hydraulic oil discharged from the main pumps 14L and 14R increases the negative control pressures generated upstream of the negative control throttles 18L and 18R. As a result, the controller 30 reduces the amounts of discharge of the main pumps 14L and 14R down to the minimum allowable amount of discharge, and suppresses the pressure loss (pumping loss) when the discharged hydraulic oil passes through the center bypass oil paths C1L and C1R.

On the other hand, in the case where any of the hydraulic actuators is operated through the operation device 26, the hydraulic oil discharged from the main pumps 14L and 14R flows into a hydraulic actuator to be operated through a control valve corresponding to the hydraulic actuator to be operated. Then, the flow of the hydraulic oil discharged from the main pumps 14L and 14R reduces or eliminates the amounts reaching the negative control throttles 18L and 18R, and reduces the negative control pressures generated upstream of the negative control throttles 18L and 18R. As a result, the controller 30 can increase the amounts of discharge of the main pumps 14L and 14R, circulate sufficient hydraulic oil to the hydraulic actuator to be operated, and reliably drive the hydraulic actuator to be operated.

[Details of Configuration Related to Machine Control Function of Shovel]

Next, with reference to FIG. 4A to 4C, a configuration of the shovel 100 related to the machine control function will be described in detail.

Figure 4A:
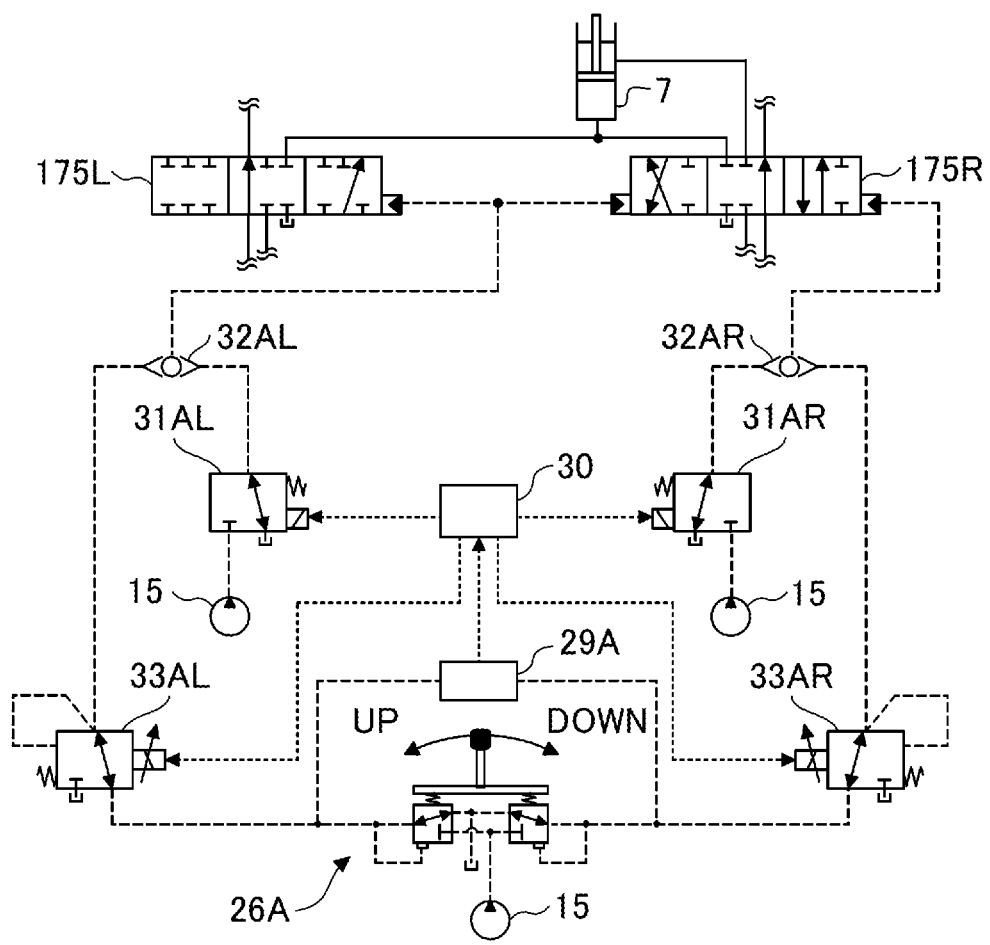
FIG. 4A schematically illustrates an example of part of the configuration of the hydraulic system of the shovel related to an operation system according to the present embodiment.
Figure 4B:
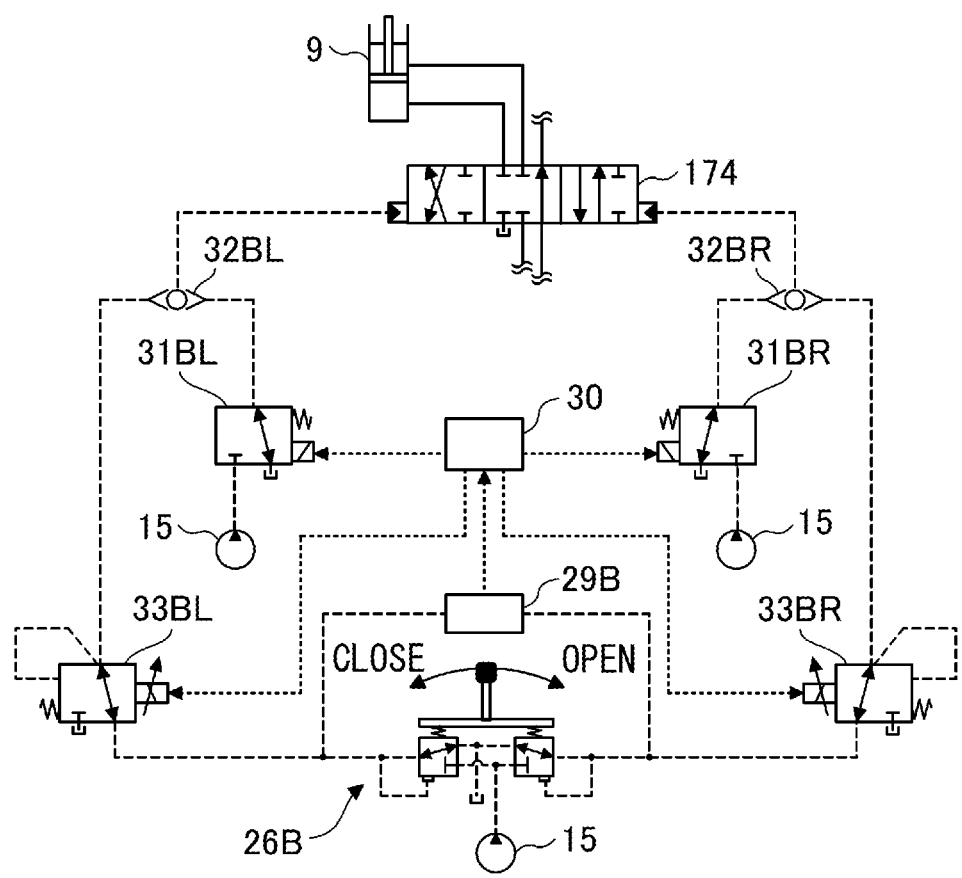
FIG. 4B schematically illustrates an example of part of the configuration of the hydraulic system of the shovel related to the operation system according to the present embodiment.
Figure 4C:
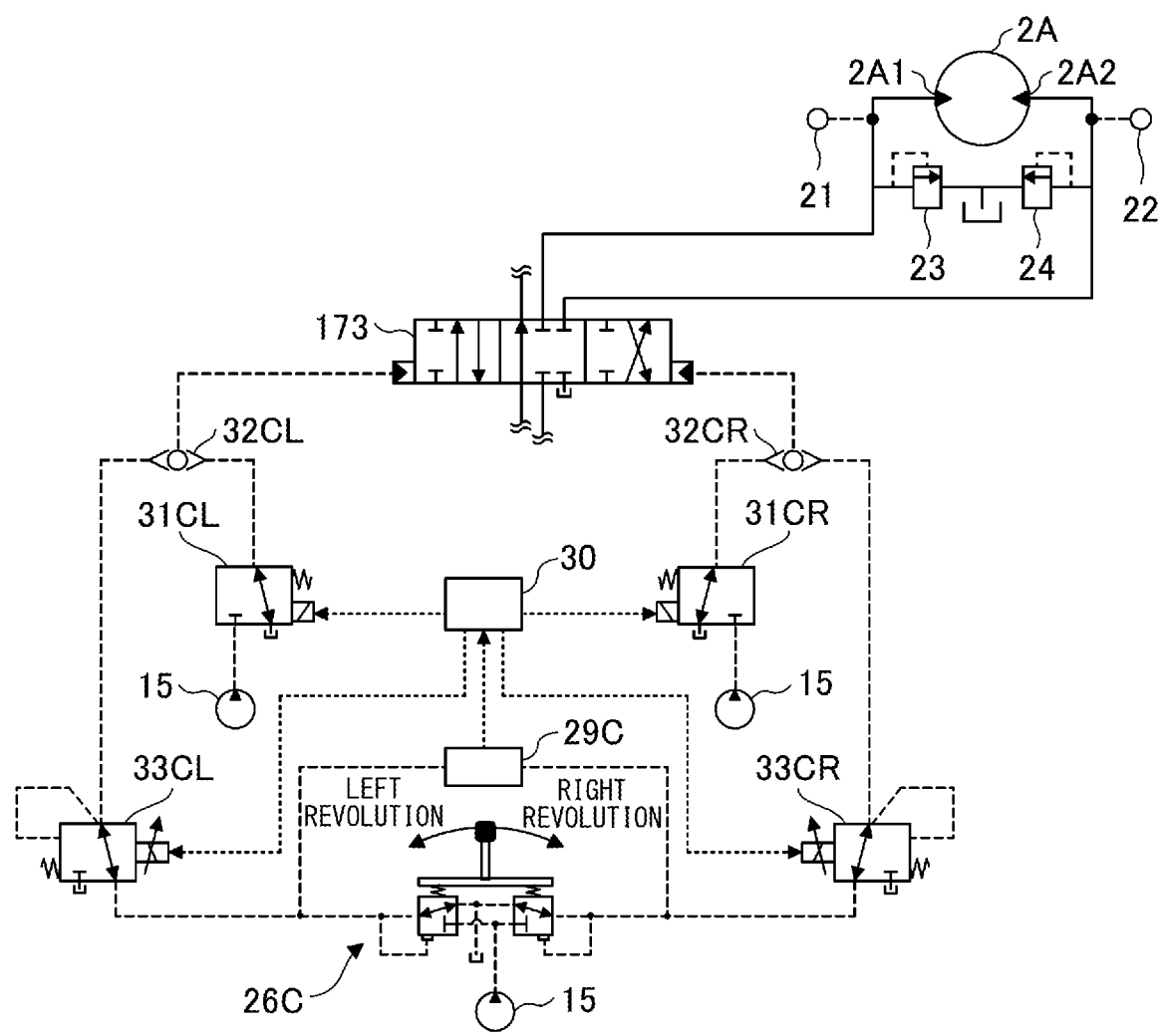
FIG. 4C schematically illustrates an example of part of the configuration of the hydraulic system of the shovel related to the operation system according to the present embodiment.

FIGS. 4A to 4C are diagrams each illustrating an example of part of the configuration related to the operation system in the hydraulic system of the shovel 100 according the present embodiment. Specifically, FIG. 4A is a diagram illustrating an example of a pilot circuit for applying pilot pressures to the control valves 175L and 175R that execute hydraulic control of the boom cylinder 7. Also, FIG. 4B is a diagram illustrating an example of a pilot circuit for applying pilot pressures to the control valve 174 that executes hydraulic control of the bucket cylinder 9. Also, FIG. 4C is a diagram illustrating an example of a pilot circuit for applying pilot pressures to the control valve 173 that executes hydraulic control of the hydraulic motor for revolution 2A.

Also, for example, as illustrated in FIG. 4A, the lever device 26A is used by the operator or the like for operating the boom cylinder 7 corresponding to the boom 4. The lever device 26A uses hydraulic oil discharged from the pilot pump 15, to output a pilot pressure corresponding to the operational contents on the secondary side.

The shuttle valve 32AL has one of the two input ports connected to a pilot line on the secondary side of the lever device 26A corresponding an operation in the upward direction of the boom 4 (referred to as the "boom-up operation", hereafter); the other input port connected to a pilot line on the secondary side of the proportional valve 31AL; and the output port connected to the right pilot port of control valve 175L and the left pilot port of the control valve 175R.

The shuttle valve 32AR has one of the two input port connected to a pilot line on the secondary side of the lever device 26A corresponding to an operation in the downward direction of the boom 4 in the DN direction (referred to as the "boom-down operation", hereafter); the other input port connected to a pilot line on the secondary side of the proportional valve 31AR; and the output port connected to the right pilot port of the control valve 175R.

In other words, the lever device 26A causes pilot pressures according to operational contents (e.g., operation direction and operation amount) to work on the pilot ports of the control valves 175L and 175R via the shuttle valves 32AL and 32AR. Specifically, in the case a boom-up operation is performed, the lever device 26A outputs a pilot pressure according the amount of operation to one of the input ports of the shuttle valve 32AL, to work on the right pilot port of the control valve 175L and the left pilot port of the control valve 175R via the shuttle valve 32AL. Also, in the case a boom-down operation is performed, the lever device 26A outputs a pilot pressure according the amount of operation to one of the input ports of the shuttle valve 32AR, to work on the right pilot port of the control valve 175R via the shuttle valve 32AR.

The proportional valve 31AL operates in response to a control current input from the controller 30. Specifically, the proportional valve 31AL uses hydraulic oil discharged from the pilot pump 15, to output a pilot pressure according to the control current input from the controller 30, to the other input port of the shuttle valve 32AL. This enables the proportional valve 31AL to adjust the pilot pressure working on the right pilot port of the control valve 175L and the left pilot port of the control valve 175R via the shuttle valve 32AL.

The proportional valve 31AR operates in response to a control current input from the controller 30. Specifically, the proportional valve 31AR uses hydraulic oil discharged from the pilot pump 15, to output a pilot pressure according to the control current input from the controller 30, to the other input port of the shuttle valve 32AR. This enables the proportional valve 31AR to adjust the pilot pressure working on the right pilot port of the control valve 175R via the shuttle valve 32AR.

In other words, the proportional valves 31AL and 31AR can adjust the pilot pressures to be output on the secondary side, so as to stop the control valves 175L and 175R at any valve positions, regardless of the operational state of the lever device 26A.

Like the proportional valve 31AL, a proportional valve 33AL functions as a control valve for machine control. The proportional valve 33AL is arranged on a pipeline connecting the operation device 26 and the corresponding shuttle valve 32AL, and is configured to be capable of changing the flow area of the pipeline. In the present embodiment, the proportional valve 33AL operates in response to a control command output by the controller 30. Therefore, regardless of an operation on the operation device 26 performed by the operator, the controller 30 can supply hydraulic oil discharged by the operation device 26, after reducing the pressure of the hydraulic oil, to the pilot port of a corresponding control valve from among the control valves 17, via the shuttle valve 32AL.

Similarly, a proportional valve 33AR functions as a control valve for machine control. The proportional valve 33AR is arranged on a pipeline connecting the operation device 26 and the corresponding shuttle valve 32AR, and is configured to be capable of changing the flow area of the pipeline. In the present embodiment, the proportional valve 33AR operates in response to a control command output by the controller 30. Therefore, regardless of an operation on the operation device 26 performed by the operator, the controller 30 can supply hydraulic oil discharged by the operation device 26, after reducing the pressure of the hydraulic oil, to the pilot port of a corresponding control valve from among the control valves 17, via the shuttle valve 32AR.

The operational pressure sensor 29A detects the operational contents with respect to the lever device 26A performed by the operator, as a pressure (operational pressure), and a detection signal corresponding to the detected pressure is taken into the controller 30. This enables the controller 30 to grasp the operational contents performed on the lever device 26A.

The controller 30 can supply hydraulic oil discharged from the pilot pump 15 to the right pilot port of the control valve 175L and the left pilot port of the control valve 175R, via the proportional valve 31AL and the shuttle valve 32AL, regardless of the boom-up operation on the lever device 26A performed by the operator. Also, the controller 30 can supply hydraulic oil discharged from the pilot pump 15 to the right pilot port of the control valve 175R via the proportional valve 31AR and the shuttle valve 32AR, regardless of the boom-down operation on the lever device 26A performed by the operator. In other words, the controller 30 can control up and down operations of the boom 4 automatically. Also, even in the case where an operation is being performed on a particular operation device 26, the controller 30 can forcibly stop the operation of the hydraulic actuator corresponding to the particular operation device 26.

The proportional valve 33AL operates in response to a control command (a current command) output by the controller 30. Then, the proportional valve 33AL reduces the pilot pressure that is generated with hydraulic oil from the pilot pump 15, and introduced to the right pilot port of the control valve 175L and to the left pilot port of the control valve 175R, via the lever device 26A, the proportional valve 33AL, and the shuttle valve 32AL. The proportional valve 33AR operates in response to a control command (a current command) output by the controller 30. Also, it reduces the pilot pressure that is generated with hydraulic oil from the pilot pump 15, and introduced to the right pilot port of the control valve 175R, via the lever device 26A, the proportional valve 33AR, and the shuttle valve 32AR. The proportional valves 33AL and 33AR can adjust the pilot pressures so as to stop the control valves 175L and 175R at any respective valve positions.

With this configuration, even in the case where a boom-up operation is being performed by the operator, if required, the controller 30 can reduce the pilot pressures working on the pilot ports on the boom-up side of the control valves 175 (the left pilot port of the control valve 175L and the right pilot port of the control valve 175R), to forcibly stop the closing operation of the boom 4. The same applies to the case of forcibly stopping a boom-down operation of the boom 4 while the boom-down operation is being performed by the operator.

Alternatively, even in the case where a boom-up operation is performed by the operator, if required, the controller 30 may control the proportional valve 31AR to increase the pilot pressure working on the pilot port on the boom-down side of the control valves 175 (the right pilot port of the control valve 175R) on the opposite side of the pilot ports with respect to the boom-up side of the control valves 175, so as to forcibly return the control valves 175 to the neutral position, and thereby, to forcibly stop the boom-up operation of the boom 4. In this case, the proportional valve 33AL may be omitted. The same applies to the case of forcibly stopping a boom-down operation of the boom 4 while the boom-down operation is being performed by the operator.

As illustrated in FIG. 4B, the lever device 26B is used by the operator or the like for operating the bucket cylinder 9 corresponding to the bucket 6. The lever device 26B uses hydraulic oil discharged from the pilot pump 15, to output a pilot pressure corresponding to the operational contents on the secondary side.

The shuttle valve 32BL has one of the two input port connected to a pilot line on the secondary side of the lever device 26B corresponding to an operation of the bucket 6 in the closing direction (referred to as the "bucket closing operation", hereafter); the other input port connected to a pilot line on the secondary side of the proportional valve 31BL; and the output port connected to the left pilot port of the control valve 174.

The shuttle valve 32BR has one of the two input port connected to a pilot line on the secondary side of the lever device 26B corresponding to an operation of the bucket 6 in the opening direction (referred to as the "bucket opening operation", hereafter); the other input port connected to a pilot line on the secondary side of the proportional valve 31BR; and the output port connected to the right pilot port of the control valve 174.

In other words, the lever device 26B causes pilot pressures according to operational contents to work on the pilot ports of the control valve 174 via the shuttle valves 32BL and 32BR. Specifically, in the case a bucket closing operation is performed, the lever device 26B outputs a pilot pressure according the amount of operation to one of the input ports of the shuttle valve 32BL, to work on the left pilot port of the control valve 174 via the shuttle valve 32BL. Also, in the case a bucket opening operation is performed, the lever device 26B outputs a pilot pressure according the amount of operation to one of the input ports of the shuttle valve 32BR, to work on the right pilot port of the control valve 174 via the shuttle valve 32BR.

The proportional valve 31BL operates in response to a control current input from the controller 30. Specifically, the proportional valve 31BL uses hydraulic oil discharged from the pilot pump 15, to output a pilot pressure according to the control current input from the controller 30, to the other pilot port of the shuttle valve 32BL. This enables the proportional valve 31BL to adjust the pilot pressure working on the left pilot port of the control valve 174 via the shuttle valve 32BL.

The proportional valve 31BR operates in response to a control current output by the controller 30. Specifically, the proportional valve 31BR uses hydraulic oil discharged from the pilot pump 15, to output a pilot pressure according to the control current input from the controller 30, to the other pilot port of the shuttle valve 32BR. This enables the proportional valve 31BR to adjust the pilot pressure working on the right pilot port of the control valve 174 via the shuttle valve 32BR.

In other words, the proportional valves 31BL and 31BR can adjust the pilot pressures to be output on the secondary side, so as to stop the control valve 174 at any valve position, regardless of the operational state of the lever device 26B.

Like the proportional valve 31BL, a proportional valve 33BL functions as a control valve for machine control. The proportional valve 33BL is arranged on a pipeline connecting the operation device 26 and the corresponding shuttle valve 32BL, and is configured to be capable of changing the flow area of the pipeline. In the present embodiment, the proportional valve 33BL operates in response to a control command output by the controller 30. Therefore, regardless of an operation on the operation device 26 performed by the operator, the controller 30 can supply hydraulic oil discharged by the operation device 26, after reducing the pressure of the hydraulic oil, to the pilot port of a corresponding control valve from among the control valves 17, via the shuttle valve 32BL.

Similarly, a proportional valve 33BR functions as a control valve for machine control. The proportional valve 33BR is arranged on a pipeline connecting the operation device 26 and the corresponding shuttle valve 32BR, and is configured to be capable of changing the flow area of the pipeline. In the present embodiment, the proportional valve 33BR operates in response to a control command output by the controller 30. Therefore, regardless of an operation on the operation device 26 performed by the operator, the controller 30 can supply hydraulic oil discharged by the operation device 26, after reducing the pressure of the hydraulic oil, to the pilot port of a corresponding control valve from among the control valves 17, via the shuttle valve 32BR.

The operational pressure sensor 29B detects the operational contents with respect to the lever device 26B performed by the operator, as a pressure (operational pressure), and a detection signal corresponding to the detected pressure is taken into the controller 30. This enables the controller 30 to grasp the operational contents performed on the lever device 26B.

The controller 30 can supply hydraulic oil discharged from the pilot pump 15 to the left pilot port of the control valve 174 via the proportional valve 31BL and the shuttle valve 32BL, regardless of the bucket closing operation on the lever device 26B performed by the operator. Also, the controller 30 can supply hydraulic oil discharged from the pilot pump 15 to the right pilot port of the control valve 174 via the proportional valve 31BR and the shuttle valve 32BR, regardless of the bucket opening operation on the lever device 26B performed by the operator. In other words, the controller 30 can control opening and closing operations of the bucket 6 automatically. Also, even in the case where an operation is being performed on a particular operation device 26, the controller 30 can forcibly stop the operation of the hydraulic actuator corresponding to the particular operation device 26.

Note that in the case where the operator is performing a bucket closing operation or a bucket opening operation, operations of the proportional valves 33BL and 33BR to forcibly stop the operation of the bucket 6 are the same as the operations of the proportional valves 33AL and 33AR to forcibly stop the operation of the boom 4 in the case where the operator is performing a boom-up operation or a boom-down operation, and duplicate description is omitted.

Also, for example, as illustrated in FIG. 4C, the lever device 26C is used by the operator or the like for operating the hydraulic motor for revolution 2A corresponding to the revolving upper body 3 (revolution mechanism 2). The lever device 26C uses hydraulic oil discharged from the pilot pump 15, to output a pilot pressure corresponding to the operational contents on the secondary side.

The shuttle valve 32CL has one of the two input ports connected to a pilot line on the secondary side of the lever device 26C corresponding a revolution operation in the left direction of the revolving upper body 3 (referred to as the "leftward revolution operation", hereafter); the other input port connected to a pilot line on the secondary side of the proportional valve 31CL; and the output port connected to the left pilot port of control valve 173.

The shuttle valve 32CR has one of the two input ports connected to a pilot line on the secondary side of the lever device 26C corresponding a revolution operation in the right direction of the revolving upper body 3 (referred to as the "rightward revolution operation", hereafter); the other input port connected to a pilot line on the secondary side of the proportional valve 31CR; and the output port connected to the right pilot port of control valve 173.

In other words, the lever device 26C causes pilot pressures according to operational contents in the left-and-right direction to work on the pilot ports of the control valve 173 via the shuttle valves 32CL and 32CR. Specifically, in the case a leftward revolution operation is performed, the lever device 26C outputs a pilot pressure according the amount of operation to one of the input ports of the shuttle valve 32CL, to work on the left pilot port of the control valve 173 via the shuttle valve 32CL. Also, in the case a rightward revolution operation is performed, the lever device 26C outputs a pilot pressure according the amount of operation to one of the input ports of the shuttle valve 32CR, to work on the right pilot port of the control valve 173 via the shuttle valve 32CR.

The proportional valve 31CL operates in response to a control current input from the controller 30. Specifically, the proportional valve 31CL uses hydraulic oil discharged from the pilot pump 15, to output a pilot pressure according to the control current input from the controller 30, to the other pilot port of the shuttle valve 32CL. This enables the proportional valve 31CL to adjust the pilot pressure working on the left pilot port of the control valve 173 via the shuttle valve 32CL.

The proportional valve 31CR operates in response to a control current output by the controller 30. Specifically, the proportional valve 31CR uses hydraulic oil discharged from the pilot pump 15, to output a pilot pressure according to the control current input from the controller 30, to the other pilot port of the shuttle valve 32CR. This enables the proportional valve 31CR to adjust the pilot pressure working on the right pilot port of the control valve 173 via the shuttle valve 32CR.

In other words, the proportional valves 31CL and 31CR can adjust the pilot pressures to be output on the secondary side, so as to stop the control valve 173 at any valve position, regardless of the operational state of the lever device 26C.

Like the proportional valve 31CL, a proportional valve 33CL functions as a control valve for machine control. The proportional valve 33CL is arranged on a pipeline connecting the operation device 26 and the corresponding shuttle valve 32CL, and is configured to be capable of changing the flow area of the pipeline. In the present embodiment, the proportional valve 33CL operates in response to a control command output by the controller 30. Therefore, regardless of an operation on the operation device 26 performed by the operator, the controller 30 can supply hydraulic oil discharged by the operation device 26, after reducing the pressure of the hydraulic oil, to the pilot port of a corresponding control valve from among the control valves 17, via the shuttle valve 32CL.

Similarly, a proportional valve 33CR functions as a control valve for machine control. The proportional valve 33CR is arranged on a pipeline connecting the operation device 26 and the corresponding shuttle valve 32CR, and is configured to be capable of changing the flow area of the pipeline. In the present embodiment, the proportional valve 33CR operates in response to a control command output by the controller 30. Therefore, regardless of an operation on the operation device 26 performed by the operator, the controller 30 can supply hydraulic oil discharged by the operation device 26, after reducing the pressure of the hydraulic oil, to the pilot port of a corresponding control valve from among the control valves 17, via the shuttle valve 32CR.

The operational pressure sensor 29C detects the operational state with respect to the lever device 26C performed by the operator, as a pressure, and a detection signal corresponding to the detected pressure is taken into the controller 30. This enables the controller 30 to grasp the operational contents performed on the lever device 26C in the left-and-right direction.

The controller 30 can supply hydraulic oil discharged from the pilot pump 15 to the left pilot port of the control valve 173 via the proportional valve 31CL and the shuttle valve 32CL, regardless of the leftward revolution operation on the lever device 26C performed by the operator. Also, the controller 30 can supply hydraulic oil discharged from the pilot pump 15 to the right pilot port of the control valve 173 via the proportional valve 31CR and the shuttle valve 32CR, regardless of the rightward revolution operation on the lever device 26C performed by the operator. In other words, the controller 30 can control a revolution operation of the revolving upper body 3 in the left-and-right direction automatically. Also, even in the case where an operation is being performed on a particular operation device 26, the controller 30 can forcibly stop the operation of the hydraulic actuator corresponding to the particular operation device 26.

Note that in the case where the operator is performing a revolution operation, operations of the proportional valves 33CL and 33CR to forcibly stop the operation of the revolving upper body 3 are the same as the operations of the proportional valves 33AL and 33AR to forcibly stop the operation of the boom 4 in the case where the operator is performing a boom-up operation or a boom-down operation, and duplicate description is omitted.

Note that the shovel 100 may further provided with an element for automatically opening or closing the arm 5, and an element for automatically driving the traveling lower body 1 forward or backward. In this case, in the hydraulic system, part of the elements related to the operation system of the arm cylinder 8, part of the elements related to the operation system of the hydraulic motor for traveling 1L, and part of the elements related to the operation system of the hydraulic motor for traveling 1R may be configured in substantially the same way as the part of the elements related to the operation system of the boom cylinder 7 (FIGS. 4A to 4C).

[Details of Configuration Related to Function of Detecting Load of Earth and Sand of the Shovel]

Next, with reference to FIG. 5, details of a configuration of a function of detecting load of earth and sand of the shovel 100 according to the present embodiment will be described. FIG. 5 is a diagram schematically illustrating an example of part of the configuration related to the function of detecting load of earth and sand of the shovel 100 according to the present embodiment.

As described earlier with reference to FIG. 3, the controller 30 includes the earth and sand load processing part 60 as a functional part related the function of detecting the load of earth and sand excavated with the bucket 6.

The earth and sand load processing part 60 includes a load weight calculating part 61, a maximum loadable capacity detecting part 62, an accumulated load capacity calculating part 63, a remaining loadable capacity calculating part 64, and a center of gravity of load calculating part 65.

Here, an example of operations of loading work of earth and sand (loaded matter) onto a dump truck DT by the shovel 100 according to the present embodiment will be described.

First, the shovel 100 controls an attachment to excavate earth and sand by using the bucket 6 at an excavation position by (excavation operation). Next, the shovel 100 revolves the revolving upper body 3, and moves the bucket 6 from the excavation position to an earth release position (revolution operation). The bed of the dump truck DT is arranged below the earth release position. Next, by controlling the attachment at the earth release position to discharge the earth and sand in the bucket 6, the shovel 100 loads the earth and sand in the bucket 6 onto the bed of the dump truck DT (earth and sand-discharging operation). Next, the shovel 100 revolves the revolving upper body 3, and moves the bucket 6 from the earth release position to the excavation position (revolution operation). By repeating these operations, the shovel 100 loads the excavated earth and sand onto the bed of the dump truck DT.

When the shovel 100 executes a default operation, the load weight calculating part 61 calculates the weight of the earth and sand (loaded matter) in the bucket 6. Here, the default operation is a requirement for starting calculation of the weight of the earth and sand, for example, elevation of the boom 4 up to a predetermined angle, a predetermined time elapsed after revolving the revolving upper body 3, and the like.

the weight of the earth and sand is calculated by, for example, balance of the torque around the root of the boom 4. Specifically, due to the earth and sand in the bucket 6, the thrust of the boom cylinder 7 increases, and the torque around the root of the boom 4 that is calculated from the thrust of the boom cylinder 7, also increases. The increase in torque coincides with the torque calculated from the weight of the earth and sand and the center of gravity of the earth and sand. In this way, the load weight calculating part 61 can calculate the weight of the earth and sand based on the thrust of the boom cylinder 7 (measured values of the boom rod pressure sensor S7R and the boom bottom pressure sensor S7B) and the center of gravity of the earth and sand. Note that the center of gravity of the earth and sand is estimated by the center of gravity of load calculating part 65 that will be described later. Note that although an example of calculating the weight of the earth and sand based on the thrust of the boom cylinder 7 has been described, the method of calculating the weight of the earth and sand is not limited as such. the weight of the earth and sand may be calculated based on the thrust of the arm cylinder 8 (measured values of the arm rod pressure sensor S8R and the arm bottom pressure sensor S8B), or the weight of the earth and sand may be calculated based on the thrust of the bucket cylinder 9 (measured values of the bucket rod pressure sensor S9R and the bucket bottom pressure sensor S9B). Also, the weight of the earth and sand may be calculated based on the revolution torque of the hydraulic motor for revolution 2A (measured by the hydraulic sensors 21 and 22) when revolving the revolving upper body 3.

The maximum loadable capacity detecting part 62 detects the maximum loadable capacity of the dump truck DT to be loaded with earth and sand. For example, the maximum loadable capacity detecting part 62 identifies the dump track DT, based on images captured by the imaging device S6. Next, the maximum loadable capacity detecting part 62 detects the maximum loadable capacity of the dump track DT, based on images of the identified dump track DT. For example, the maximum loadable capacity detecting part 62 determines the type (size etc.) of the dump track DT based on an image of the identified dump track DT. The maximum loadable capacity detecting part 62 has a table in which a vehicle type is associated with a maximum loadable capacity, and based on the vehicle type determined from the image and the table, determines the maximum loadable capacity of the dump truck DT. Note that the maximum loadable capacity detecting part 62 may receive as input through the input device 42, the maximum loadable capacity, the vehicle type, and the like of the dump track DT, to determine the maximum loadable capacity of the dump truck DT based on the input information from the input device 42.

The accumulated load capacity calculating part 63 calculates the weight of the earth and sand loaded onto the dump truck DT. In other words, every time earth and sand in the bucket 6 is discharged onto the bed of the dump truck DT, the accumulated load capacity calculating part 63 accumulates the weight of the earth and sand in the bucket 6 calculated by the load weight calculating part 61, to calculate the accumulated load capacity (total weight) as the total weight of earth and sand loaded on the bed of the dump truck DT. Note that in the case where the dump truck DT to be loaded with earth and sand is replaced with a new dump truck DT, the accumulated load capacity is reset.

The remaining loadable capacity calculating part 64 calculates, as the remaining loadable capacity, a difference between the maximum loadable capacity of the dump truck DT detected by the maximum loadable capacity detecting part 62, and the current accumulated load capacity calculated by the accumulated load capacity calculating part 63. The remaining loadable capacity is the remaining loadable weight of earth and sand that can be loaded on the dump truck DT.

The center of gravity of load calculating part 65 estimates the center of gravity of the earth and sand (loaded matter) in the bucket 6. The center of gravity of load calculating part 65 estimates the position of the center of gravity of the earth and sand by using, for example, one of the first and second estimation methods of the center of gravity.

(First Estimation Method of Center of Gravity)

The first estimation method of the center of gravity by the center of gravity of load calculating part 65 will be described. As described earlier, according to the present embodiment, there are no sensors to detect the bucket angle. Therefore, it is configured such that the position of the bucket 6 cannot be directly detected by a sensor.

Meanwhile, in the case of measuring the weight of the earth and sand (in a default operation), the operator operates the operation device 26 to position the bucket 6 to be horizontal so that the earth and sand to be excavated do not fall off from the bucket 6. Therefore, in the case of measuring the weight of the earth and sand (in the default operation), the center of gravity of load calculating part 65 estimates the center of gravity of the earth and sand, regarding that the bucket 6 is the positioned horizontally. without directly detecting the position of the bucket 6. Then, the load weight calculating part 61 calculates the weight of the earth and sand based on the estimated center of gravity of the earth and sand. Here, the estimated angle of the bucket 6 does not need to be horizontal. A predetermined angle defined in advance (e.g., an angle of 5 degrees opening from the horizontal place) may be set as an estimated angle, and the center of gravity of the earth and sand and the center of gravity of the bucket may be estimated, regarding the position being at the predetermined angle. Also, the controller 30 calculates the center of gravity of the earth and sand, regarding that the shape of the earth and sand loaded in the bucket 6 is almost the same shape.

Figure 6A:
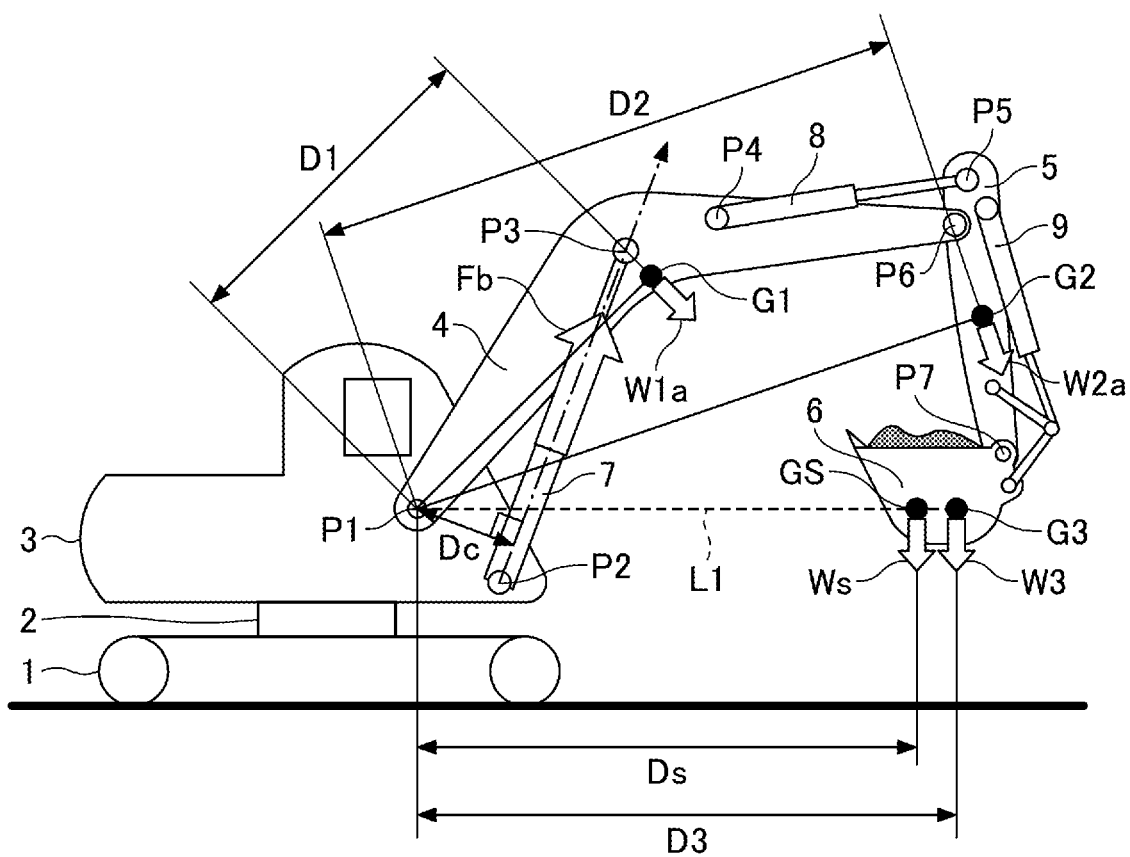
FIG. 6A is a schematic diagram illustrating parameters for calculation of the weight of the earth and sand and for estimation of the center of gravity of the earth and sand in an attachment of the shovel.
Figure 6B:
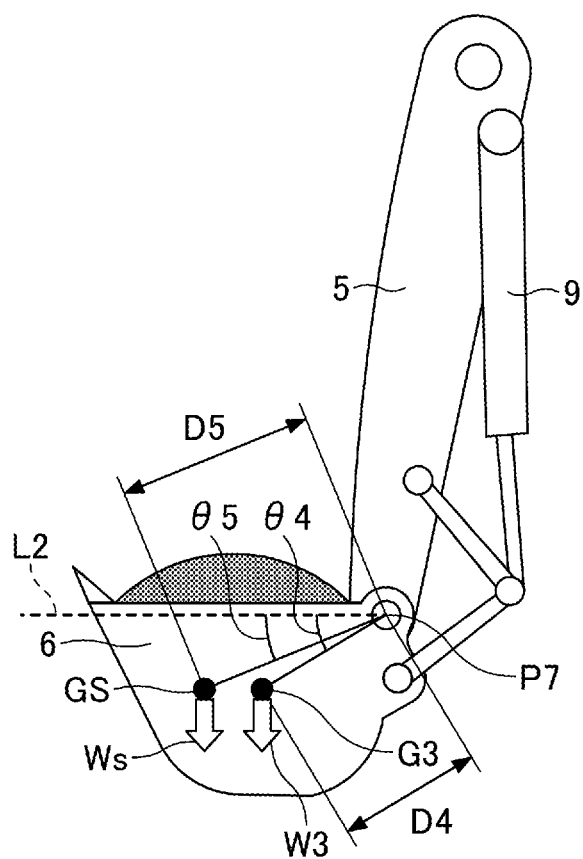
FIG. 6B is a schematic diagram illustrating parameters for calculation of the weight of the earth and sand and for estimation of the center of gravity of the earth and sand in an attachment of the shovel.

The method will be further described with reference to FIGS. 6A and 6B. FIGS. 6A and 6B are schematic diagrams illustrating parameters for calculation of the weight of the earth and sand and estimation of center of gravity of earth and sand in an attachment of the shovel 100. FIG. 6A illustrates the shovel 100, and FIG. 6B illustrates the vicinity of the bucket 6. Assume that in the following description, that a pin P1 that will be described later, the center of gravity of the bucket G3, and the center of gravity of the earth and sand Gs are located on a horizontal line L1.

Here, a pin connecting the revolving upper body 3 and the boom 4 is denoted as P1. A pin connecting the revolving upper body 3 and the boom cylinder 7 is denoted as P2. A pin connecting the boom 4 and the boom cylinder 7 is denoted as P3. A pin connecting the boom 4 and the arm cylinder 8 is denoted as P4. A pin connecting the arm 5 and the arm cylinder 8 is denoted as P5. A pin connecting the boom 4 and the arm 5 is denoted as P6. A pin connecting the arm 5 and the bucket 6 is denoted as P7. Also, the center of gravity of the boom 4 is denoted as G1. The center of gravity of the arm 5 is denoted as G2. The center of gravity of the bucket 6 is denoted as G3. the center of gravity of the earth and sand (loaded latter) loaded in the bucket 6 is denoted as Gs. Assume that a reference line L2 passes through the pin P7 and is parallel to the opening face of the bucket 6. Also, the distance between the pin P1 and the center of gravity G4 of the boom 4 is denoted as D1. The distance between the pin P1 and the center of gravity G5 of the arm 5 is denoted as D2. The distance between the pin P1 and the center of gravity G6 of the bucket 6 is denoted as D3. The distance between the pin P1 and the center of gravity Gs of the earth and sand is denoted as Ds. The distance between a line connecting the pins P2 and P3, and the pin P1 is denoted as Dc. Also, a detected value of the cylinder pressure of the boom cylinder 7 is denoted as Fb. Also, in the weight of the boom, the vertical component in a direction perpendicular to the line connecting pin P1 and the center of gravity of the boom G1 is denoted as W1a. In the weight of the arm, the vertical component in a direction perpendicular to the line connecting pin P1 and the center of gravity of the arm G2 is denoted as W2a. The weight of the bucket 6 is denoted as W6, and the weight of the earth and sand (loaded matter) loaded in the bucket 6 is denoted as Ws.

As illustrated in FIG. 6A, the position of the pin P7 is calculated with the boom angle and the arm angle. In other words, the position of the pin P7 can be calculated based on detected values of the boom angle sensor S1 and the arm angle sensor S2.

Also, as illustrated in FIG. 6B, the positional relationship between the pin P7 and the center of gravity of the bucket G3 (where θ4 represents an angle formed by the reference line L2 of the bucket 6 and the straight line connecting the pin P7 and the center of gravity of the bucket G3; and D4 is a distance between the pin P7 and the center of gravity of the bucket G3) is a default value. Also, the positional relationship between the pin P7 and the center of gravity of the earth and sand Gs (θ5 is an angle formed by the reference line L2 of the bucket 6 and the straight line connecting the pin P7 and the center of gravity of the earth and sand Gs; and D5 is a distance between the pin P7 and the center of gravity of the earth and sand Gs) is determined, for example, experimentally in advance, and stored in the controller 30.

Here, by regarding that the position of the bucket 6 is horizontal (i.e., the reference line L2 is horizontal) in the default operation of calculating the weight of the earth and sand, the position of the bucket 6 is determined uniquely, and the center of gravity of the earth and sand Gs and the center of gravity of the bucket G3 can be estimated. Here, the estimated angle of the bucket 6 does not need to be horizontal. A predetermined angle defined in advance (e.g., an angle of 5 degrees opening from the horizontal place) may be set as an estimated angle, and the center of gravity of the earth and sand and the center of gravity of the bucket may be estimated, regarding the position being at the predetermined angle. Also, the controller 30 calculates the center of gravity of the earth and sand, regarding that the shape of the earth and sand loaded in the bucket 6 is almost the same shape.

In other words, the center of gravity of load calculating part 65 can estimate the center of gravity of the earth and sand Gs, based on the detected values of the boom angle sensor S1 and the arm angle sensor S2.

Next, a formula of the balance involving each moment around the pin P1 and the boom cylinder 7 can be expressed by the following Formula (1).

$$WsDs + W1aD1 + W2aD2 + W3D3 = FbDc \quad (1)$$

Formula (1) can be expressed by the following Formula (2) with respect to the weight of the earth and sand Ws.

$$Ws = (FbDc - (W1aD1 + W2aD2 + W3D3))/Ds \quad (2)$$

Here, the detected value Fb of the cylinder pressure of the boom cylinder 7 is calculated with the boom rod pressure sensor S7R and the boom bottom pressure sensor S7B. The distance Dc and the vertical component W1a of the weight are calculated by the boom angle sensor S1. The vertical component W2a of the weight and the distance D2 are calculated with the boom angle sensor S1 and the arm angle sensor S2. The distance D1 and the weight W3 are known values. Also, by estimating the center of gravity of the earth and sand Gs and the center of gravity of the bucket G3, the distance Ds and the distance D3 can also be estimated.

Therefore, the weight of the earth and sand Ws can be calculated based on a detected value of the cylinder pressure of the boom cylinder 7 (detected values of the boom rod pressure sensor S7R and the boom bottom pressure sensor S7B), a boom angle (a detected value of the boom angle sensor S1), and an arm angle (a detected value of the arm angle sensor S2). This enables the load weight calculating part 61 to calculate the weight of the earth and sand Ws based on the center of gravity of the earth and sand Gs estimated by the center of gravity of load calculating part 65.

Note that whether or not the shovel 100 is under a default operation can be determined by estimating the position of the attachment based on the detected value of the pilot of bucket cylinder 9.

Note that in the above description, although the center of gravity of the earth and sand is estimated, and the weight of the earth and sand is calculated, regarding the position of the bucket 6 in the default operation as horizontal, the process is not limited as such. For example, the position of the bucket 6 may be estimated based on an image of the bucket 6 captured by the camera S6F that captures a front image. Also, in the case where the bucket 6 is captured in an image by the camera S6F, if it is determined based on the image that the position of the bucket 6 is horizontal, estimation of the center of gravity of the earth and sand and calculation of the load of earth and sand may be executed.

(Second Estimation Method of Center of Gravity)

Next, another method of estimating the center of gravity of the earth and sand by the center of gravity of load calculating part 65 will be described.

As illustrated in FIG. 2, the spool displacement sensor 184 is provided for detecting displacement of the spool of the control valve 174 corresponding to the bucket cylinder 9. Based on a detected value of the spool displacement sensor 184, the center of gravity of load calculating part 65 derives an estimate Q1 of the flow (passing flow) of hydraulic oil passing through the control valve 174. For example, it derives the estimate of Q1 by using Formula (3) to Formula (7).

[Math. 1]

$$Q_1 = c \times A \times \sqrt{\frac{2 \times \Delta P}{\rho}} \quad (3)$$

$$F_s = -2 \times C_d \times A \times \Delta P \times \cos\phi = k \times (x - x_N) \quad (4)$$

$$A = f(x) \quad (5)$$

$$\Delta P = \frac{k \times (x_N - x)}{2 \times C_d \times A \times \cos\phi} = \frac{k \times (x_N - x)}{2 \times C_d \times f(x) \times \cos\phi} \quad (6)$$

$$Q_1 = c \times A \times \sqrt{\frac{2 \times \Delta P}{\rho}} = \sqrt{\frac{C_d \times A \times k \times (x_N - x)}{\rho \times \cos\phi}} = \sqrt{\frac{C_d \times f(x) \times k \times (x_N - x)}{\rho \times \cos\phi}} \quad (7)$$

Formula (3) relates to the flow of hydraulic oil passing through the control valve. In Formula (3), c represents the flow coefficient, A represents the opening area of the control valve, ρ represents the density of hydraulic oil, and ΔP represents the pressure difference before and after the control valve 174. In the present application example, c and ρ are values stored in advance.

Formula (4) relates to the fluid force exerted on the control valve by the hydraulic oil passing through the control valve. In Formula (4), Fs represents the fluid force of the hydraulic oil passing through the control valve, and Cd represents the flow coefficient. Here, φ represents the angle of inflow as an angle between the moving direction of the control valve and the flow direction of the hydraulic oil, and k represents the spring constant of a return spring for returning the control valve to the neutral valve position. In the present application example, Cd, φ, and k are values stored in advance. Also, x represents the amount of spool displacement of the control valve when oil is flowing (when the hydraulic oil actually passes through the control valve), and xN is the amount of spool displacement of the control valve when oil is not flowing (when the hydraulic oil does not pass through the control valve, namely, when the control valve is operating in vacuum). In the present application example, the amount x of spool displacement represents the actual amount of spool displacement in response to a spool control command, and is a value detected by the spool displacement sensor 184. The amount xN of spool displacement while no oil passes through is a theoretical amount of spool displacement determined according to a spool control command, and is stored in advance associated with a value of spool control command. In this way, Formula (4) expresses that the fluid force Fs is determined uniquely from the amount x of spool displacement.

Formula (5) expresses that the opening area A of the control valve is a function of the amount x of spool displacement of the control valve while oil flows. In other words, it expresses that the opening area A is determined uniquely from the amount x of spool displacement. Also, Formula (6) is derived from Formula (4) and Formula (5), and expresses that the pressure difference ΔP is determined uniquely from the amount x of spool displacement. Further, Formula (7) is derived from Formula (3) through Formula (6), and expresses that the estimate Q1 is determined uniquely from the amount x of spool displacement.

In this way, the center of gravity of load calculating part 65 can derive the estimate Q1 based on the amount x of spool displacement as a value detected by the spool displacement sensor 184, and Formula (7). Also, the spool displacement sensor 184 is not required necessarily. For example, the estimate of Q1 can also be derived by estimating the opening area A of the spool based on the opening characteristic of the spool with respect to the pilot pressure (the amount of lever operation).

Also, the center of gravity of load calculating part 65 estimates the stroke of the bucket cylinder 9 from an integral value of the flow of hydraulic oil flowing through the bucket cylinder (the estimated value Q1). Also, the center of gravity of load calculating part 65 estimates the bucket angle based on an estimated stroke. Also, the center of gravity of load calculating part 65 estimates the center of gravity of the earth and sand based on an estimated bucket angle. As illustrated in FIGS. 6A and 6B, the position of the pin P7 can be calculated based on detected values of the boom angle sensor S1 and the arm angle sensor S2. Also, the position of the center of gravity of the earth and sand Gs with respect to pin P7 can be estimated based on an estimated bucket angle.

In other words, the center of gravity of load calculating part 65 can estimate the center of gravity of the earth and sand Gs based on a detected value of the spool displacement sensor 184. This enables the load weight calculating part 61 to calculate the weight of the earth and sand Ws based on the center of gravity of the earth and sand Gs estimated by the center of gravity of load calculating part 65.

FIG. 7 is a control flow diagram of an attachment. The controller 30 repeatedly executes this process in predetermined cycles.

In the example in FIG. 7, an automatic attachment control process is executed on a shovel provided with pilot spool valves. However, the automatic attachment control process may be executed, for example, on a shovel provided with electromagnetic spool-type control valves (solenoid spool valves).

When the operator operates the lever device 26B, a pilot pressure depending on the amount of operation works on the pilot port of the control valve 174. Also, by using the proportional valve 31BL, a pilot pressure according to the control current input from the controller 30 works on the pilot port of the control valve 174. This causes the spool of the control valve 174 to be displaced (Step ST1).

When the spool is displaced, a flow of hydraulic oil through the control valve 174, namely, a flow of hydraulic oil into the bucket cylinder 9 is generated (Step ST2). Here, a flow of hydraulic oil that flows into the bucket cylinder 9 through an opening formed by the spool displaced in response to the pilot pressure, is generated.

Once the hydraulic oil flows into the bucket cylinder 9, the bucket cylinder 9 extends or contracts (Step ST3). Here, the bucket cylinder 9 extends or contracts at a speed v according to the inflow amount of the hydraulic oil (estimated value Q1).

Thereafter, the center of gravity of load calculating part 65 calculates the displacement of the bucket cylinder 9 (Step ST4). Here, the stroke of the bucket cylinder 9 is estimated from the integrated value of the speed v. In other words, the stroke of the bucket cylinder 9 is estimated from an integral value of the flow of hydraulic oil (the estimated value Q1).

As described above, according to the shovel 100 in the present embodiment, the excavated weight of earth and sand can be detected. Also, according to the shovel 100 in the present embodiment, the center of gravity of the earth and sand can be estimated by the center of gravity of load calculating part 65, and the weight of the earth and sand can be calculated based on the estimated center of gravity of the earth and sand. Also, the controller 30 calculates the center of gravity of the earth and sand, regarding that the shape of the earth and sand loaded in the bucket 6 is almost the same shape.

Meanwhile, for example, in the case where the shovel 100 excavates earth and sand at a bottom of water, a lower part of the arm and the bucket are submerged. At this time, if using a conventional shovel (e.g., Patent Document 1), a sensor for detecting the stroke of the bucket cylinder is also submerged. Therefore, the sensor of the bucket cylinder is required to be water resistant, dust resistant, rust resistant, and shock resistant compared to the boom angle meter and the arm angle meter. Therefore, as the sensor of the bucket cylinder, an expensive sensor that satisfy requirements including water resistance and the like is used.

In contrast, according to the shovel 100 in the present embodiment, a sensor to measure the stroke of the bucket cylinder can be eliminated. This enables the shovel 100 according to the present embodiment to reduce the cost of the shovel 100 without the need for an expensive sensor, while having the capability of detecting a load of earth and sand loaded on the bucket 6. Also, by reducing the number of parts, the reliability of the shovel 100 can be improved.

Also, the shovel 100 can calculate the weight of the earth and sand loaded onto the dump truck DT. This can prevent overload on the dump truck DT. For example, the load of the dump truck DT is checked by a truck scale or the like before leaving the working site to a public road. In the case where the load exceeds the maximum loadable capacity, the dump truck DT needs to return to the position of the shovel 100, and to reduce the amount of earth and sand. Therefore, the operational efficiency of the dump truck DT declines. Also, underloading of the dump truck DT increases the total number of dump trucks DT transporting earth and sand, and reduces the operational efficiency of the dump truck DT. In contrast, according to the shovel 100 in the present embodiment, earth and sand can be loaded on the dump truck DT while preventing overload, and thereby, the operational efficiency of the dump truck DT can be improved.

The display device 40 may display the weight of the earth and sand in the bucket 6 calculated by the load weight calculating part 61, the maximum loadable capacity of the dump truck DT detected by the maximum loadable capacity detecting part 62, the accumulated load capacity of the dump truck DT calculated by the accumulated load capacity calculating part 63 (the total weight of earth and sand loaded on the bed), and the remaining loadable capacity of the dump truck DT calculated by the remaining loadable capacity calculating part 64 (the remaining loadable weight of earth and sand). This allows the operator on board the shovel 100 to load earth and sand onto the dump truck DT by working with reference to these displays.

Note that the display device 40 may be configured to issue a warning in the case where the accumulated load capacity exceeds the maximum loadable capacity. Also, the display device 40 may be configured to issue a warning in the case where the calculated weight of the earth and sand in the bucket 6 exceeds the remaining loadable capacity. Note that the warning is not limited to a form of being displayed on the display device 40, and may be a sound output by the sound output device 43. This makes it possible to prevent earth and sand from being loaded in excess of the maximum loadable capacity of the dump truck DT.

[Excavation and Loading Operations of Shovel]

Figure 8:
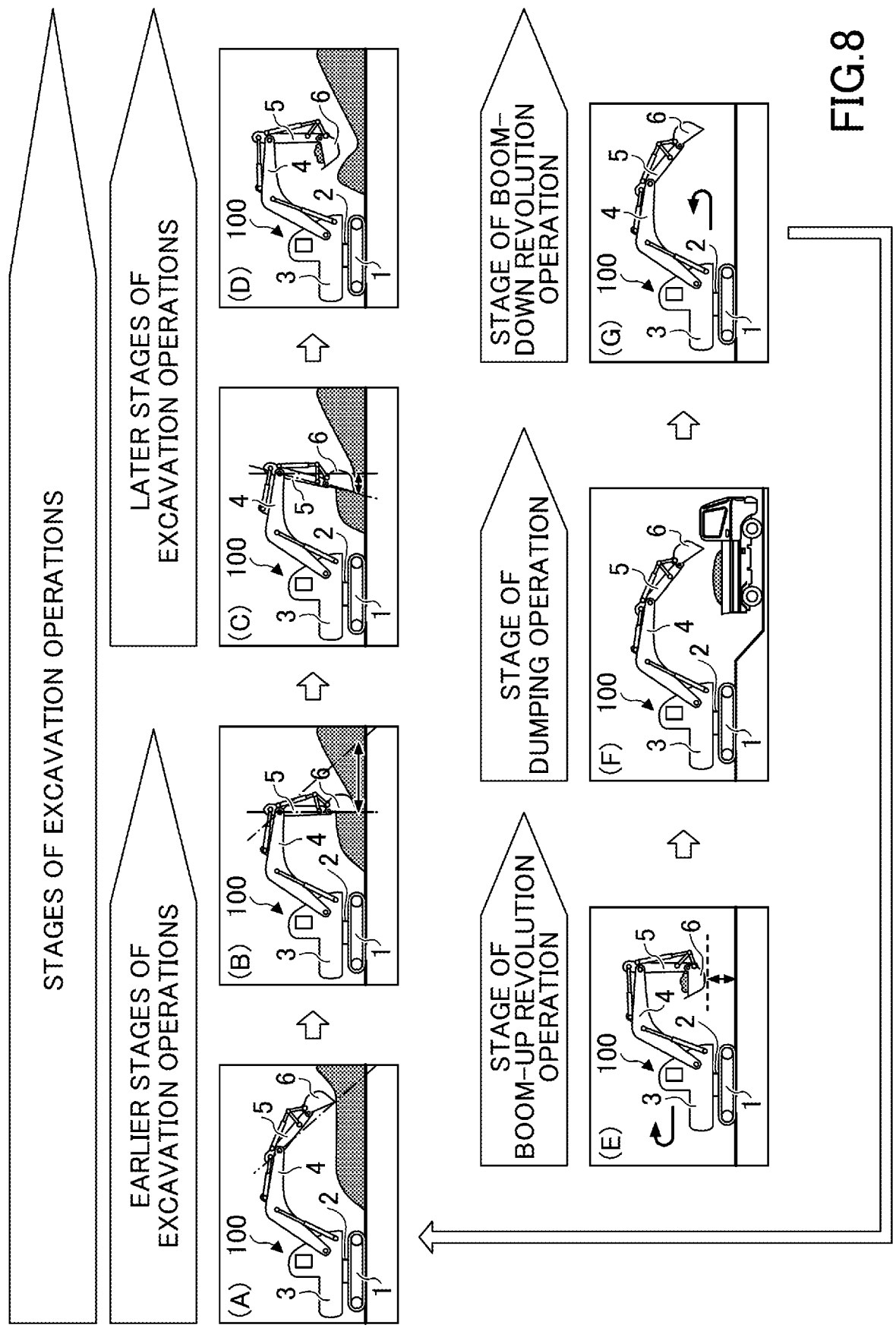
FIG. 8 is an explanatory diagram illustrating a workflow of "excavation and loading operations" of a shovel.

A flow of "excavation and loading operations" of the shovel 100 will be described with reference to FIG. 8. FIG. 8 is an explanatory diagram illustrating a workflow of "excavation and loading operations" of the shovel 100.

In FIG. 8, (A) to (D) illustrate states of the excavation operations being execute (stages of the excavation operations). Also, the excavation operations can be divided into earlier excavation operations (A) in FIG. 8 and (B) in FIG. 8, and later excavation operations (C) in FIG. 8 and (D) in FIG. 8.

As illustrated in (A) in FIG. 8, the operator positions the tip of the bucket 6 so as to come to a desired height position with respect to matter to be excavated, and closes the arm 5 from an opening position of the arm 5 as illustrated in (B) in FIG. 8 to an angle (about 90 degrees) at which the arm 5 is virtually perpendicular to the ground. By these operations, earth and sand down to a certain depth are excavated, and the matter to be excavated is swept until the arm 5 becomes virtually perpendicular to the ground surface. The operations described above will be referred to the earlier excavation operations, and these operation stages will be referred to as the earlier stages of excavation operations.

As illustrated in (C) in FIG. 8, the operator further closes the arm 5, to further sweep the matter to be excavated by the bucket 6. Then, the operator closes the bucket 6 until the top edge becomes almost horizontal (about 90 degrees), contains the collected excavated earth and sand in the bucket 6, and elevates the boom 4 to elevate the bucket 6 up to a position as illustrated in (D) in FIG. 8. The operations described above will be referred to later excavation operations, and these operation stages will be referred to as the later stages of excavation operations. The operation of (C) in FIG. 8 may be a combined operation of the arm 5 and the bucket 6. Note that at the timing of elevating the boom 6, the load weight calculating part 61 may calculate the weight of the loaded matter in the bucket 6.

Next, in a state of the upper edge of the bucket 6 being substantially horizontal, the operator elevates the boom 4 until the bottom of the bucket 6 comes to a desired height from the ground as illustrated in (E) in FIG. 8. The desired height is, for example, a height higher than the height of a dump truck. Thereafter or simultaneously, the operator revolves the revolving upper body 3 as indicated by an arrow, to move the bucket 6 to a position at which the earth and sand is discharged. Note that at the timing of revolving the revolving upper body 3, the load weight calculating part 61 may calculate the weight of the loaded matter in the bucket 6.

Once completing the boom-up and revolution operations, the operator opens the arm 5 and the bucket 6 as illustrated in (F) in FIG. 8 to discharge the earth and sand in the bucket 6 onto the dump truck DT. In this dumping operation, only the bucket 6 may be opened for discharging the earth and sand.

Once completing the dumping operation, next, as illustrated in (G) in FIG. 8, the operator revolves the revolving upper body 3 as indicated by an arrow, to move the bucket 6 directly above the excavation position. At this time, simultaneously with the revolution, the operator descends the boom 4 so as to descend the bucket 6 to the desired height from the matter to be excavated. Thereafter, the operator descends the bucket 6 down to a desired height as illustrated in (A) in FIG. 8, to perform the excavation operation again.

The operator repeats the cycle constituted with "earlier excavation operations", "later excavation operations", "boom-up and revolution operations", "dumping operation", and "boom-down and revolution operations", to advance the "excavation and loading operations".

[Autonomous Control Function of Shovel]

Figure 9:
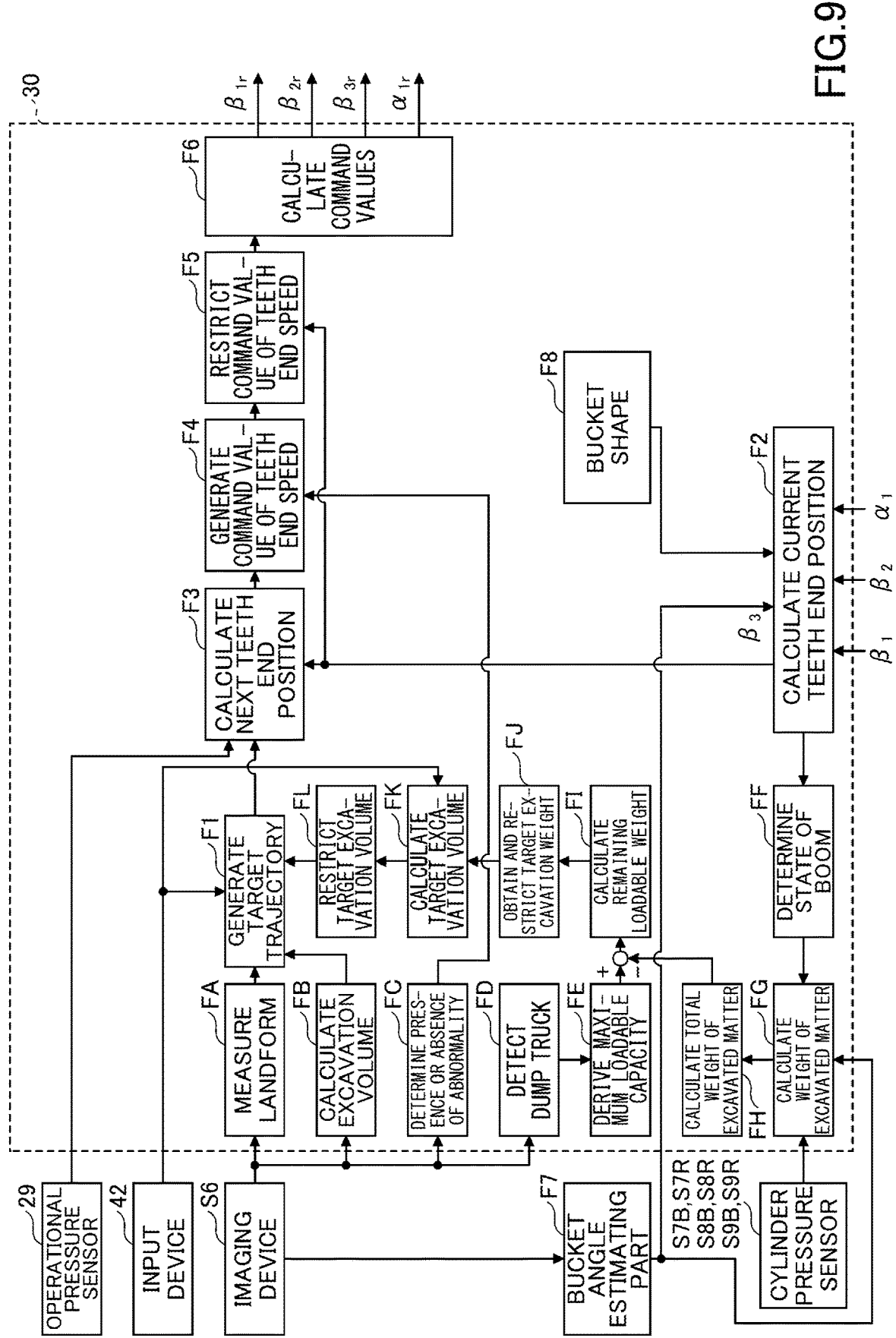
FIG. 9 is a block diagram illustrating an example of a configuration of autonomous control functions.

Also, the shovel 100 may execute autonomous control functions as follows, to autonomously execute complex operations of an excavation operation and the like. FIG. 9 is a block diagram illustrating an example of a configuration of autonomous control functions;

In the example in FIG. 9, the controller 30 includes functional elements FA to FL and F1 to F8 for executing autonomous control. The functional elements may be implemented by software, may be implemented by hardware, or may be implemented by a combination of software and hardware.

The functional element FA is configured to measure a landform. In the example in FIG. 9, the functional element FA measures the latest state of the landform in the surroundings of the shovel 100, based on images captured by the imaging device S6 as the surroundings monitoring device.

The surroundings monitoring device is configured to detect an object present in the surroundings of the shovel 100. The object may be, for example, a person, an animal, a vehicle, a construction machine, a building, a wall, a fence, a hole, a helmet, a safety vest, work clothes, a predetermined mark on a helmet, or the like. The surroundings monitoring device may be, for example, an ultrasonic sensor, a millimeter-wave radar, a laser radar, or the like.

The surroundings monitoring device may be configured to detect a predetermined object present within a predetermined region set in the surroundings of the shovel 100. In other words, the surroundings monitoring device may be configured to be capable of identifying at least one of the type, position, shape, and the like of an object. For example, the surroundings monitoring device may be configured to distinguish a person from an object other than a person. Also, the surroundings monitoring device may be configured to calculate the distance from the surroundings monitoring device or the shovel 100 to the recognized object.

The functional element FB is configured to calculate the excavation volume. In the example in FIG. 9, the functional element FB calculates the volume of excavated matter that has been actually excavated in an individual excavation operation as the excavation volume, based on images captured by the imaging device S6.

The functional element FC is configured to determine presence or absence of various types of abnormalities. In the example in FIG. 9, the functional element FC is configured to determine presence or absence of abnormalities of the imaging device S6, based on images captured by the imaging device S6. Then, in the case of determining that the state of the imaging device S6 is abnormal, the functional element FC outputs a command to the functional element F4, which will be described later, to slow down or stop the motion of the shovel 100.

The functional element FD is configured to detect a dump track DT. In the example in FIG. 9, the functional element FD detect a dump track DT, based on images captured by the imaging device S6.

The functional element FE is configured to derive the maximum loadable capacity of the dump track DT that has been detected by the functional element FD. In the example in FIG. 9, the functional element FE derives the maximum loadable capacity of the dump track DT, based on images captured by the imaging device S6. The functional element FE derives the maximum loadable capacity of the dump track DT, for example, by identifying whether the dump track DT is a 10-ton track.

The functional element FF is configured to determine the state of the boom 4. In the example in FIG. 9, the functional element FF determines whether the boom 4 has risen to the height at which the bucket 6 that has taken in the excavated matter has left the ground. This is to detect that the excavation operation has been completed.

Specifically, the functional element FF determines whether the boom 4 has risen to the height at which the bucket 6 that has taken in the excavated matter has left the ground, based on the current position of the teeth end of the bucket 6 calculated by functional element F2, which will be described later. The functional element FF may determine whether the boom 4 has risen to the height at which the bucket 6 that has taken in the excavated matter has left the ground, based on images captured by the imaging device S6.

The functional element FG is configured to calculate the weight of the excavated matter taken in the bucket 6. In the example in FIG. 9, the functional element FG calculates the weight of the excavated matter taken in the bucket 6, based on the outputs of the cylinder pressure sensors in the case where the functional element FF has determined that the boom 4 has risen to the height at which the bucket 6 that has taken in the excavated matter has left the ground. The functional element FG may calculate the weight of the matter to be excavated taken into the bucket 6, based on the position of the excavation attachment calculated by the functional element F2 that will be described later, the bucket angle estimated by the bucket angle estimation part F7 that will be described later, and the output of the cylinder pressure sensor.

The functional element FH is configured to calculate the total weight of the excavated matter loaded onto the dump track DT. In the example in FIG. 9, the FH of the functional element calculates the total weight of the excavated matter already loaded onto the bed of the dump truck DT, by adding up the weight of the matter excavated by each excavation operation calculated by the functional element FG.

The functional element FI is configured to calculate the remaining loadable weight. In the example in FIG. 9, the functional element FI calculates the remaining loadable weight, by subtracting the total weight of the excavated matter calculated by functional element FH from the maximum loadable capacity derived by the functional element FE. For example, in the case where the maximum loadable capacity is 10 tons and the total weight of excavated matter already loaded onto the bed of the dump truck DT is 6 tons, the functional element FH calculates 4 tons as the remaining loadable weight.

The functional element FJ is configured to obtain the target excavation weight, which is the weight of the excavated matter to be taken in the bucket 6 in the next excavation operation, and to restrict the obtained value when necessary. In the example in FIG. 9, the functional element FJ performs reading in the storage device 47, to obtain the maximum excavation weight, which is the maximum value of the excavated matter that can be excavated in an individual excavation operation. Then, in the case where the remaining loadable weight calculated by the functional element FI is greater than the maximum excavation weight, the functional element FJ restricts the target excavation weight by the maximum excavation weight. For example, even if the remaining loadable weight is 4 tons, as long as the maximum excavation weight is 3 tons, the functional element FJ outputs 3 tons as the target excavation weight. Note that the maximum excavation weight may be a value that is dynamically input or calculated.

The functional element FK is configured to calculate the target excavation volume. In the example in FIG. 9, the functional element FK calculates the target excavation volume, based on the target excavation weight output by the functional element FJ, and the soil information input through the input device 42. The functional element FK calculates the target excavation volume, for example, based on the target excavation weight and the density of the excavated matter. The functional element FK calculates the target excavation volume, for example, corresponding to the target excavation weight of 3 tons. Basically, even if the target excavation weight is 3 tons, with a smaller density of the excavated matter, the target excavation volume becomes greater.

The functional element FL is configured to restrict the target excavation volume. In the example in FIG. 9, in the case where the target excavation volume calculated by the functional element FK is greater than the maximum excavation volume, the functional element FL restricts the target excavation volume by the maximum excavation volume. For example, even if the target excavation volume is 3 cubic meters, as long as the maximum excavation volume is 2 cubic meters, the functional element FL outputs 2 cubic meters as the target excavation volume. In this way, in order to prevent the excavated matter taken in the bucket 6 from falling off during a subsequent revolution operation or the like, the controller 30 restricts the target excavation volume when necessary. Note that the maximum excavation volume may be a value that is dynamically input or calculated.

The functional element F1 is configured to generate a target trajectory. In the example in FIG. 9, the functional element F1 generates, as the target trajectory, a target trajectory to be traced by the teeth end of the bucket 6, based on the information on the excavation input via the input device 42, the current landform measured by the functional element FA, the actual excavation volume obtained by the past excavation operations calculated by the functional element FB, and the target excavation volume output by the functional element FL. The information on the excavation is, for example, information on predetermined excavation conditions set in advance. An excavating condition may be, for example, the degree of deepness or shallowness.

Typically, the functional element F1 is configured to calculate the target trajectory before each excavation operation is started. In other words, the target trajectory is typically updated before each excavation operation is started. Specifically, the coordinates of the excavation start position as the start point of the target trajectory, and the coordinates of the excavation end position as the end point of the target trajectory are updated before each excavation operation is started.

The functional element F2 is configured to calculate the current position of the teeth end. In the example in FIG. 9, the functional element F2 calculates the coordinate point of the teeth end of the bucket 6 as the current position of the teeth end, based on the boom angle $\beta 1$ detected by the boom angle sensor S1, the arm angle $\beta 2$ detected by the arm angle sensor S2, the bucket angle $\beta 3$ detected by the bucket angle estimation part F7 that will be described later, the angle of revolution a1 detected by the revolutional angular velocity sensor S5, and the bucket shape F8. The functional element F2 may use the output of the machine tilt sensor S4 when calculating the current position of the teeth end.

The functional element F3 is configured to calculate the next position of the teeth end. In the example in FIG. 9, the functional element F3 calculates the position of the teeth end after a predetermined period of time as the target position of the teeth end, based on the operation data output by the operational pressure sensor 29, the target track generated by the functional element F1, and the current position of the teeth end calculated by the functional element F2.

The functional element F3 may determine whether the divergence between the current position of the teeth end and the target track is within an allowable range. In the example in FIG. 9, the functional element F3 determines whether the distance between the current position of the teeth end and the target track is less than or equal to a predetermined value. Then, in the case where the distance is less than or equal to the predetermined value, the functional element F3 determines that the divergence is within the allowable range, and calculates the target position of the teeth end. On the other hand, in the case where the distance exceeds the predetermined value, the functional element F3 determines that the divergence is not within the allowable range, and slows down or stops the motion of the actuator regardless of the amount of lever operation.

The functional element F4 is configured to generate a command value related to the speed of the teeth end. In the example in FIG. 9, based on the current position of the teeth end calculated by functional element F2 and the next position of the teeth end calculated by functional element F3, the functional element F4 calculates the speed of the teeth end required for moving the teeth end from the current position to the next position within a predetermined time, as a command value related to the speed of the teeth end.

The functional element F5 is configured to restrict a command value related to the speed of the teeth end. In the example in FIG. 9, based on the current position of the teeth end calculated by the functional element F2 and images captured by the imaging device S6 as the surroundings monitoring device, in the case of determining that the distance between the teeth end and a predetermined object such as a dump track DT is less than a predetermined value, the functional element F5 restricts the command value related to the speed of the teeth end by a predetermined upper limit. In this way, the controller 30 slows down the speed of the teeth end when the teeth end approaches the predetermined object. The functional element F5 may be configured to change the upper limit based on the weight of excavated matter taken in the bucket 6. Alternatively, the functional element F5 may be configured to change the upper limit based on the turning radius of the excavation attachment. The turning radius of the excavation attachment may be calculated by the functional element F2, or may be calculated by the functional element F5 based on the output of the functional element F2.

The functional element F6 is configured to calculate command values for operating the actuators. In the example in FIG. 9, in order to move the teeth end from the current position to the target position, based on the target position of the teeth end calculated by the functional element F3, the functional element F6 calculates a command value $\beta 1r$ related to the boom angle $\beta 1$, a command value $\beta 2r$ related to the arm angle $\beta 2$, a command value $\beta 3r$ related to the bucket angle $\beta 3$, and a command value $\alpha 1r$ related to the angle of revolution $\alpha 1$. Even when the boom 4 is not operated, the functional element F6 calculates the command value $\beta 1r$ when necessary. This is to operate the boom 4 automatically. The same applies to the arm 5, the bucket 6, and the revolution mechanism 2.

The bucket angle estimation part F7 estimates the bucket angle $\beta 3$, based on an image of the bucket 6 captured by the imaging device S6.

The bucket shape F8 may be input in advance.

Figure 10:
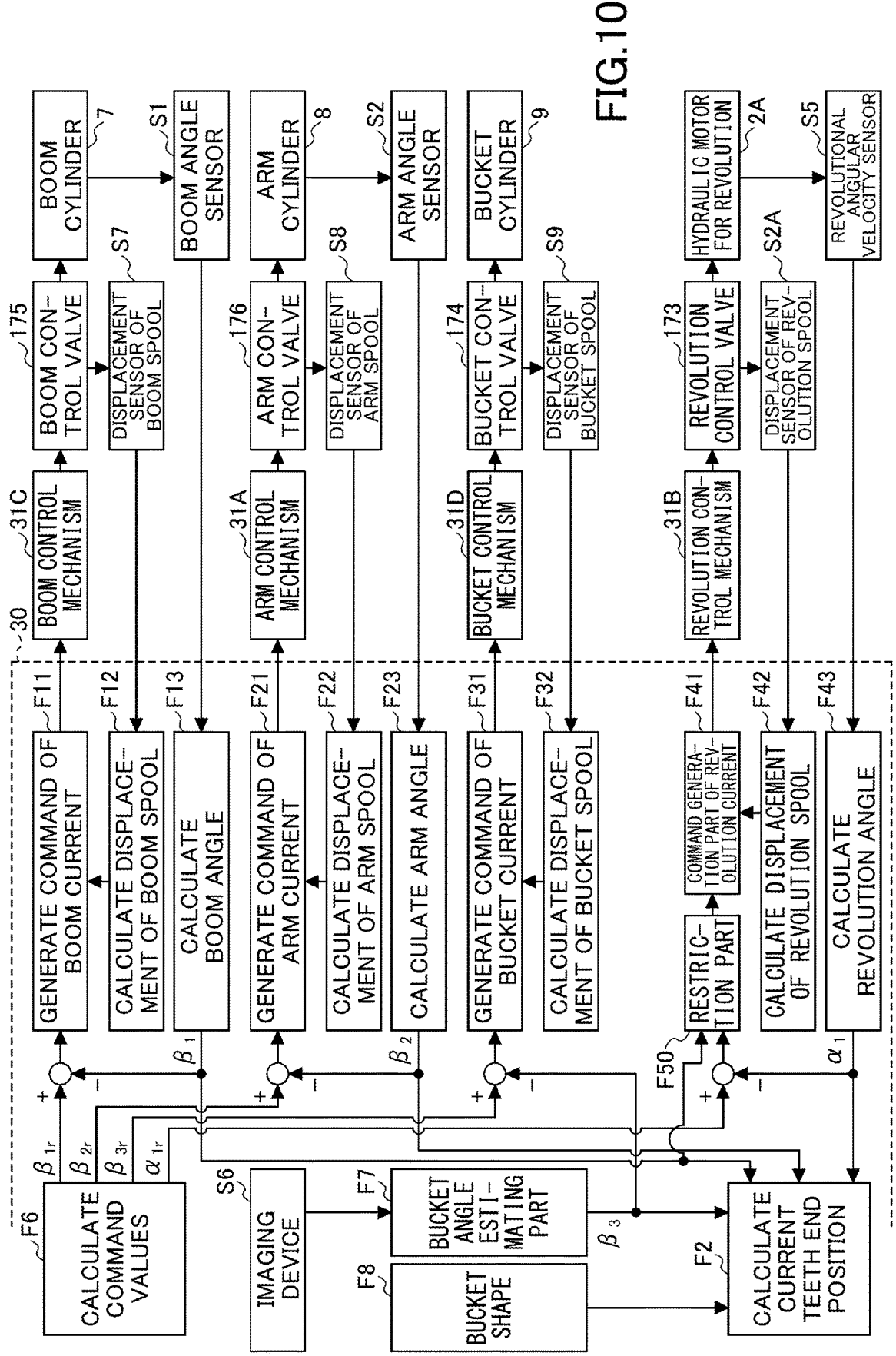
FIG. 10 is a block diagram illustrating an example of a configuration of functional elements for calculating various command values.

Next, with reference to FIG. 10, the functional element F6 will be described in detail. FIG. 10 is a block diagram illustrating an example of the configuration of the functional element F6 that calculates various command values.

The controller 30 further includes functional elements F11 to F13, F21 to F23, F31 to F32, and F50 related to generation of the command values, as illustrated in FIG. 10. The functional elements may be implemented by software, may be implemented by hardware, or may be implemented by a combination of software and hardware.

The functional elements F11 to F13 are functional elements related to the command value $\beta 1r$; the functional elements F21 to F23 are functional elements related to the command value $\beta 2r$; the functional elements F31 to F32 are functional elements related to the command value $\beta 3r$; and the functional elements F41 to F43 are functional elements related to the command value $\alpha 1r$.

The functional elements F11, F21, F31, and F41 are configured to generate electric current commands output to the actuator control mechanisms. In the present embodiment, the functional element F11 outputs a boom current command to the boom control mechanism 31C; the functional element F21 outputs an arm current command to the arm control mechanism 31A; the functional element F31 outputs a bucket current command to the bucket control mechanism 31D; and the functional element F41 outputs a revolution current command to the revolution control mechanism 31B.

The boom control mechanism 31C is configured to be capable of causing a pilot pressure according to a control current corresponding to a boom cylinder pilot pressure command, to act on the control valve 175 as a boom control valve.

The arm control mechanism 31A is configured to be capable of causing a pilot pressure according to a control current corresponding to an arm cylinder pilot pressure command, to act on the control valve 176 as an arm control valve.

The bucket control mechanism 31D is configured to be capable of causing a pilot pressure according to a control current corresponding to a bucket cylinder pilot pressure command, to act on the control valve 174 as a bucket control valve.

The revolution control mechanism 31B is configured to be capable of causing a pilot pressure according to a control current corresponding to a hydraulic motor for revolution pilot pressure command, to act on the control valve 173 as a revolution control valve.

Each of the functional elements F12, F22, F32, and F42 is configured to calculate the displacement of a spool constituting a spool valve. In the present embodiment, the functional element F12 calculates the amount of displacement of a boom spool constituting the control valve 175 related to the boom cylinder 7, based on the output of a boom spool displacement sensor S7. The functional element F22 calculates the amount of displacement of an arm spool constituting the control valve 176 related to the arm cylinder 8, based on the output of an arm spool displacement sensor S8. The functional element F32 calculates the amount of displacement of a bucket spool constituting the control valve 174 related to the bucket cylinder 9, based on the output of a bucket spool displacement sensor S9. The functional element F42 calculates the amount of displacement of a revolution spool constituting the control valve 173 related to the hydraulic motor for revolution 2A, based on the output of a revolution spool displacement sensor S2A. Note that the boom spool displacement sensor S7 is a sensor that detects the amount of displacement in the spool constituting the control valve 175. The arm spool displacement sensor S8 is a sensor that detects the amount of displacement in the spool constituting the control valve 176. The bucket spool displacement sensor S9 is a sensor that detects the amount of displacement in the spool constituting the control valve 174. In addition, the revolution spool displacement sensor S2A is a sensor that detects the amount of displacement in the spool constituting the control valve 173.

Each of the functional elements F13, F23, and F43 are configured to calculate the angle of rotation of a working body. In the present embodiment, the functional element F13 calculates the boom angle β1 based on the output of the boom angle sensor S1. The functional element F23 calculates the arm angle β2 based on the output of the arm angle sensor S2. The functional element F43 calculates the angle of revolution α1 based on the output of the revolutional angular velocity sensor S5.

Specifically, the functional element F11 basically generates a boom current command to the boom control mechanism 31C so as to make the difference become zero between the command value β1r generated by the functional element F6, and the boom angle β1 calculated by the functional element F13. At this time, the functional element F11 adjusts the boom current command so as to make the difference become zero between the target boom spool displacement amount derived from the boom current command, and the boom spool displacement amount calculated by the functional element F12. Then, the functional element F11 outputs the adjusted boom current command to the boom control mechanism 31C.

The boom control mechanism 31C changes the opening area according to the boom current command, to cause a pilot pressure corresponding to the size of the opening area to act on the pilot port of the control valve 175. The control valve 175 moves the boom spool according to the pilot pressure to flow hydraulic oil into the boom cylinder 7. The boom spool displacement sensor S7 detects the displacement of the boom spool, and feeds the detection result back to the functional element F12 of the controller 30. The boom cylinder 7 extends or contracts in response to the inflow of the hydraulic oil to move the boom 4 up or down. The boom angle sensor S1 detects the angle of rotation of the boom 4 moving up or down, and feeds the detection result back to the functional element F13 of the controller 30. The functional element F13 feeds the calculated boom angle β1 back to the functional element F2.

The functional element F21 basically generates an arm current command to the arm control mechanism 31A so as to make the difference become zero between the command value β2r generated by the functional element F6, and the arm angle β2 calculated by the functional element F23. At this time, the functional element F21 adjusts the arm current command so as to make the difference become zero between the target arm spool displacement amount derived from the arm current command, and the arm spool displacement amount calculated by the functional element F22. Then, the functional element F21 outputs the adjusted arm current command to the arm control mechanism 31A.

The arm control mechanism 31A changes the opening area according to the arm current command, to cause a pilot pressure corresponding to the size of the opening area to act on the pilot port of the control valve 176. The control valve 176 moves the arm spool according to the pilot pressure to flow hydraulic oil into the arm cylinder 8. The arm spool displacement sensor S8 detects the displacement of the arm spool, and feeds the detection result back to the functional element F22 of the controller 30. The arm cylinder 8 extends or contracts in response to the inflow of the hydraulic oil to open or close the arm 5. The arm angle sensor S2 detects the angle of rotation of the arm 5 to be opened or closed, and feeds the detection result back to the functional element F23 of the controller 30. The functional element F23 feeds the calculated arm angle β2 back to the functional element F2.

The functional element F31 basically generates a bucket current command to the bucket control mechanism 31D so as to make the difference become zero between the command value β3r generated by the functional element F6, and the bucket angle β3 estimated by the bucket angle estimation part F7. At this time, the functional element F31 adjusts the bucket current command so as to make the difference become zero between the target bucket spool displacement amount derived from the bucket current command, and the bucket spool displacement amount calculated by the functional element F32. Then, the functional element F31 outputs the adjusted bucket current command to the bucket control mechanism 31D.

The bucket control mechanism 31D changes the opening area according to the bucket current command, to cause a pilot pressure corresponding to the size of the opening area to act on the pilot port of the control valve 174. The control valve 174 moves the bucket spool according to the pilot pressure to flow hydraulic oil into the bucket cylinder 9. The bucket spool displacement sensor S9 detects the displacement of the bucket spool, and feeds the detection result back to the functional element F32 of the controller 30. The bucket cylinder 9 extends or contracts in response to the inflow of the hydraulic oil to open or close the bucket 6. The bucket angle estimation part F7 feeds the estimated bucket angle $\beta3$ back to the functional element F2.

The functional element F41 basically generates a revolution current command to the revolution control mechanism 31B so as to make the difference become zero between the command value $\alpha1r$ generated by the functional element F6, and the angle of revolution al calculated by the functional element F43. At this time, the functional element F41 adjusts the revolution current command so as to make the difference become zero between the target revolution spool displacement amount derived from the revolution current command, and the revolution spool displacement amount calculated by the functional element F42. Then, the functional element F41 outputs the adjusted revolution current command to the revolution control mechanism 31B. Note that the difference between the command value $\alpha1r$ generated by the functional element F6 and the angle of revolution al calculated by the functional element F43 may be restricted by the restriction part F50 before input into the functional element F41.

The restriction part F50 is configured to determine whether the boom 4 has risen to a predetermined height (angle) based on the boom angle $\beta1$ calculated by the functional element F13. Then, if it is determined that the boom 4 has not risen to the predetermined height (angle), the restriction part F50 is configured to restrict the difference between the command value $\alpha1r$ and the angle of revolution $\alpha1$, which is a difference to be output to the functional element F41, to be less than or equal to a predetermined value. This is to prevent the revolving upper body 3 from revolving abruptly when the boom 4 has not risen sufficiently.

The revolution control mechanism 31B changes the opening area according to the revolution current command, to cause a pilot pressure corresponding to the size of the opening area to act on the pilot port of the control valve 173. The control valve 173 moves the revolution spool according to the pilot pressure to flow hydraulic oil into the hydraulic motor for revolution 2A. The revolution spool displacement sensor S2A detects the displacement of the revolution spool, and feeds the detection result back to the functional element F42 of the controller 30. The hydraulic motor for revolution 2A revolves in response to the inflow of hydraulic oil to revolve the revolving upper body 3. The revolutional angular velocity sensor S5 detects the angle of revolution of the revolving upper body 3, and feeds the detection result back to the functional element F23 of the controller 30. The functional element F43 feeds the calculated angle of revolution al back to the functional element F2.

As described above, the controller 30 is configured to include three stages of feedback loops for the respective operating members. In other words, the controller 30 is configured to include a feedback loop related to the spool displacement amount, a feedback loop related to the angle of rotation of the operating member, and a feedback loop related to the position of the teeth end. Therefore, the controller 30 can control the motion of the teeth end of the bucket 6 with high accuracy during autonomous control.

[Example of Configuration of Main Screen]

Figure 11:
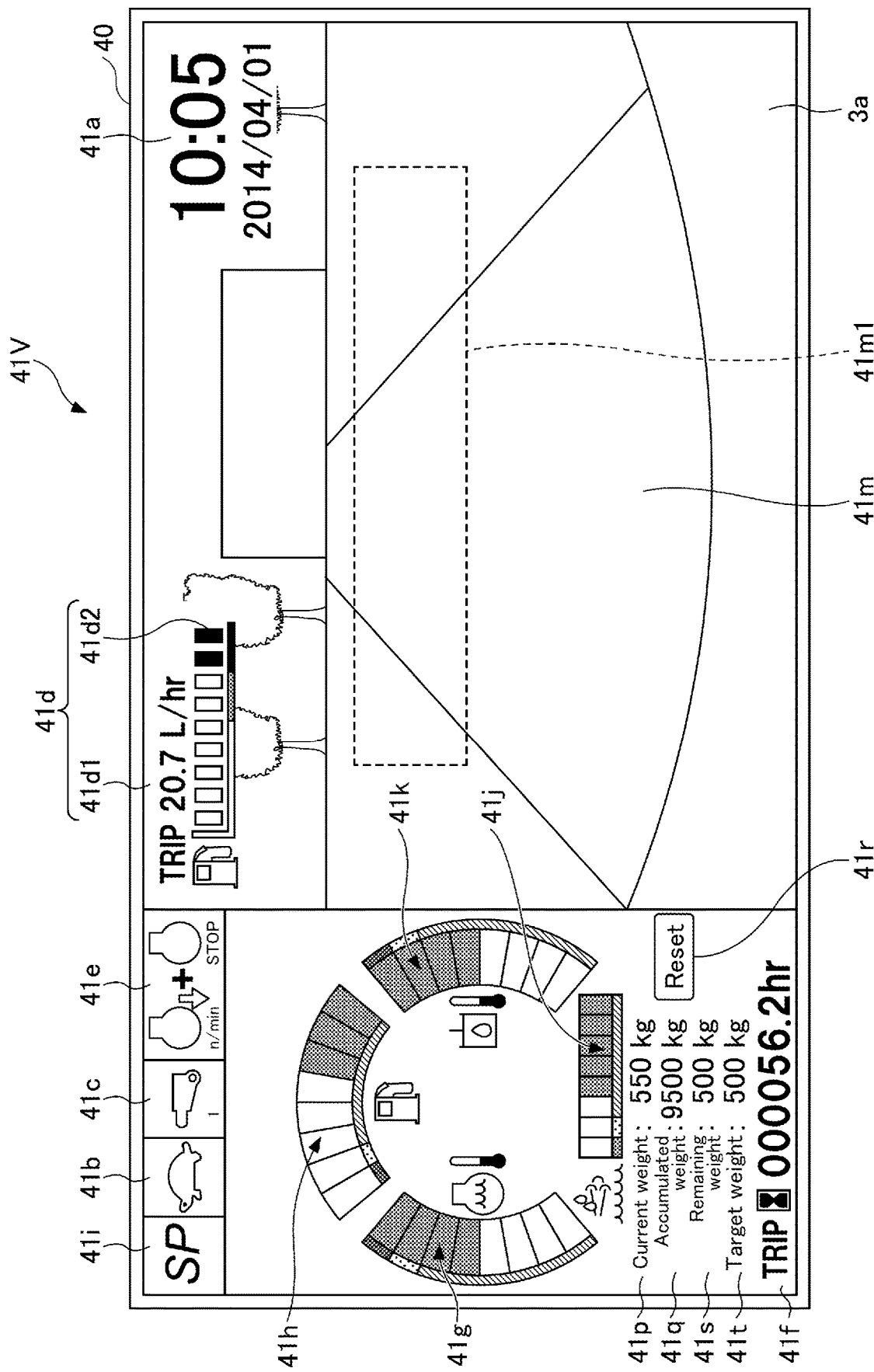
FIG. 11 is an example of a configuration of a main screen displayed on a display device.

Next, with reference to FIG. 11, an example of a configuration of a main screen 41V displayed on the display device 40 will be described. The main screen 41V in FIG. 11 is displayed on the image display part 41.

A main screen 41V includes a date and time display area 41a, a traveling mode display area 41b, an attachment display area 41c, a fuel efficiency display area 41d, an engine control state display area 41e, an engine working hours display area 41f, a cooling water temperature display area 41g, a remaining fuel display area 41h, a revolutions per minute display area 41i, a remaining urea water display area 41j, a hydraulic oil temperature display area 41k, a camera image display area 41m, a current weight display area 41p, an accumulated weight display area 41q, a reset button 41r, a remaining loadable weight display area 41s, and a target weight display area 41t.

The traveling mode display area 41b, the attachment display area 41c, the engine control state display area 41e, and the revolutions per minute display area 41i are areas that display setting state information as information on the setting states of the shovel 100. The fuel efficiency display area 41d, the engine working hours display area 41f, the cooling water temperature display area 41g, the remaining fuel display area 41h, the remaining urea water display area 41j, the hydraulic oil temperature display area 41k, the current weight display area 41p, and the accumulated weight display area 41q are areas to display operational state information as information on the operational states of the shovel 100.

Specifically, the date and time display area 41a is an area to display the current date and time. The traveling mode display area 41b is an area to display the current traveling mode. The attachment display area 41c is an area to display an image representing the end attachment currently attached. FIG. 11 illustrates a state of displaying an image representing the bucket 6.

The fuel efficiency display area 41d is an area to display information on fuel efficiency calculated by the controller 30. The fuel efficiency display area 41d includes an average fuel efficiency display area 41d1 to display the lifetime average fuel efficiency or the interval average fuel efficiency, and an instantaneous fuel efficiency display area 41d2 to display the instantaneous fuel efficiency.

The engine control state display area 41e is an area to display the control state of the engine 11. The engine working hours display area 41f is an area to display the cumulative operating hours of the engine 11. The cooling water temperature display area 41g is an area to display the current temperature condition of the engine cooling water. The remaining fuel display area 41h is an area to display the state of the remaining amount of fuel stored in the fuel tank. The revolutions per minute display area 41i is an area to display the current mode of revolutions per minute set by an engine revolutions per minute adjustment dial 75. The remaining urea water display area 41j is an area to display the remaining state of urea water stored in the urea water tank. The hydraulic oil temperature display area 41k is an area to display the temperature condition of hydraulic oil in the hydraulic oil tank.

The camera image display area 41m is an area to display an image captured by the imaging device S6. In the example in FIG. 11, the camera image display area 41m illustrates a back camera image captured by the back camera 80B. The back camera image is a back image that shows the space behind the shovel 100, and includes a counterweight image 3a.

The current weight display area 41p is an area to display the weight (current weight) of an object actually lifted by the bucket 6. FIG. 11 illustrates that the current weight is 550 kg.

The controller 30 calculates the current weight, for example, based on the position of the work attachment, the boom bottom pressure, and specifications of the work attachment registered in advance (the weight, the center of gravity position, etc.). Specifically, the controller 30 calculates the current weight based on the outputs of information obtaining devices such as the boom angle sensor S1, the arm angle sensor S2, the boom bottom pressure sensor S6*b*, and the like.

The accumulated weight display area 41*q* is an area to display the accumulated weight of objects lifted by the bucket 6 for a predetermined period of time (referred to as the "accumulated weight", hereafter). FIG. 11 illustrates that the accumulated weight is 9,500 kg.

The predetermined period of time is, for example, a period started when the reset button 41*r* was pressed. For example, when performing work of loading earth and sand onto the bed of the dump truck DT, the operator resets the accumulated weight of the dump truck DT by pressing the reset button 41*r* every time the dump truck DT to be loaded is replaced. This is to easily grasp the total weight of the earth and sand loaded in each dump truck DT.

With this configuration, the shovel 100 can prevent earth and sand that exceeds the maximum loadable weight of the dump truck DT, from being loaded on the bed of the dump truck DT. If weight measurement on a truck scale detects that loading of earth and sand exceeds the maximum loadable weight, the driver of the dump truck DT needs to return to the loading yard, and unload part of the earth and sand loaded on the bed. The shovel 100 can prevent occurrence of such adjustment work of the load weight.

The predetermined period of time may be, for example, a period of time from the time to start the work of a day until the time to end the work of the day. This is to make the total weight of the earth and sand transported by the work of the day easily recognizable by the operator or manager.

The reset button 41*r* is a software button to reset the accumulated weight. The reset button 41*r* may be a hardware button arranged on the input device 42, the left operation lever 26L, the right operation lever 26R, or the like.

The controller 30 may be configured to automatically recognize replacement of the dump track DT, and may automatically reset the accumulated weight. In this case, the controller 30 may use an image captured by the imaging device S6 to recognize the replacement of the dump track DT, or may use a communication device to recognize the replacement of the dump track DT.

Also, the controller 30 may be configured to accumulate the current weight, after recognizing that the earth and sand elevated by the bucket 6 has been loaded onto the bed of the dump truck DT, based on an image captured by the imaging device S6. This is to prevent earth and sand moved to a place other than the bed of the dump truck DT from being accumulated as the earth and sand loaded onto the dump truck DT.

The controller 30 may determine whether the earth and sand elevated in the bucket 6 has been loaded onto the bed of the dump truck DT, based on the position of the work attachment. Specifically, the controller 30 may determine that earth and sand are loaded onto the bed of the dump truck DT, for example, in the case where the height of the bucket 6 exceeds a predetermined value (e.g., the height of the bed of the dump truck DT) and a release button 65C is pressed.

The controller 30 may be configured to output a warning if it is determined that the current weight exceeds a predetermined value. The predetermined value is, for example, a value based on the rated lift weight. The warning may be a visual warning, an auditory warning, or a tactile warning. With this configuration, the controller 30 can inform the operator that the current weight exceeds or is likely to exceed the predetermined value.

The remaining loadable weight display area 41*s* is an area to display the remaining loadable weight. FIG. 11 illustrates that the accumulated weight is 9,500 kg, and the remaining loadable weight is 500 kg. In other words, the maximum loadable capacity is 10,000 kg. However, the display device 40 may display the maximum loadable capacity without displaying the remaining loadable weight, or may display the maximum loadable capacity separately from the remaining loadable weight.

The target weight display area 41*t* is an area to display the target weight of an object attracted by the bucket 6. Note that the target weight is set to a value that does not exceed the remaining loadable weight.

In the example illustrated in FIG. 11, as the remaining loadable weight is 500 kg, the target weight is set to 500 kg. In contrast, the current weight is 550 kg. Therefore, the controller 30 controls reducing the current of the bucket 6 until the current weight becomes 500 kg (target weight). This can prevent overload on the dump truck DT.

As described above, according to the shovel 100 in the present embodiment, the weight (current weight) of an object lifted by the bucket 6 can be set as the target weight.

Note that one might consider a configuration that includes a table in which a target weight is associated with a target current command, so that a desired target current command to supply a current to the bucket 6 is generated based on the associated target weight, and by the generated command, the weight of the object lifted by the bucket 6 is controlled to be closer to the target weight. However, in the case where the object to be attracted by the bucket 6 is an object that has variation in density, such as earth and sand or iron frames, even if a current value corresponding to the target weight is applied, it is expected that the weight of the object actually attracted by the bucket 6 deviates from the target weight. In contrast, according to the shovel 100 in the present embodiment, the weight of the object attracted by a lifting magnet can be coincident with the target weight.

Also, a message is displayed on the message display area 41*m*1. For example, if the current weight exceeds the target weight, a message conveying the overload is displayed. This can prevent a loading operation that would be performed before completion of the weight adjustment. Also, a message may also be displayed if the accumulated weight exceeds the maximum loadable capacity. With this message, it is possible to urge the operator to perform an unloading operation, and thereby, can prevent overload of the dump truck DT.

[Loading Support System]

Figure 12:
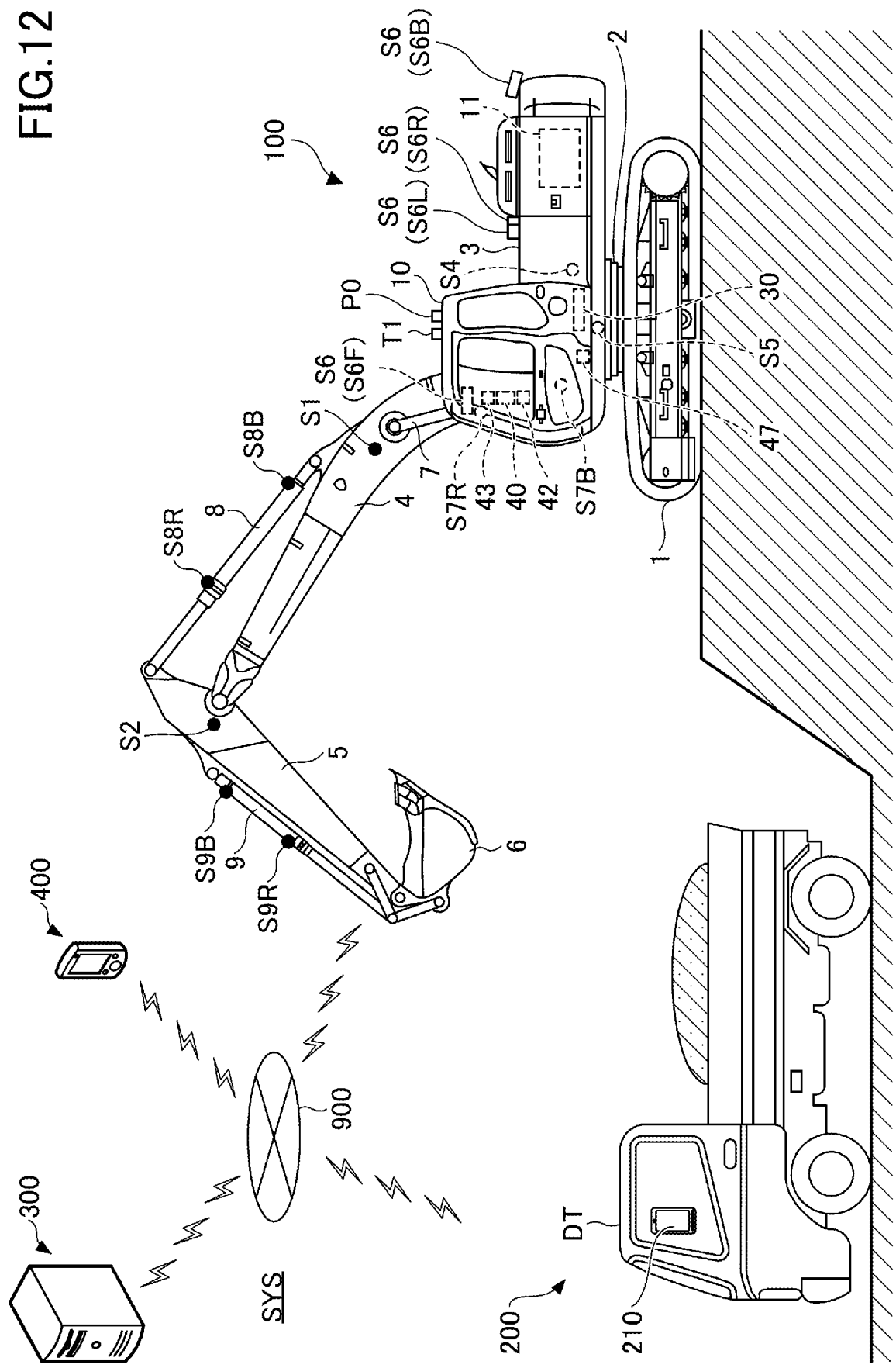
FIG. 12 is a diagram illustrating an example of a configuration of a loading support system.

Next, the loading support system SYS will be described with reference to FIG. 12. FIG. 12 is a diagram illustrating an example of a configuration of a loading support system SYS. The loading support system SYS is constituted with a shovel 100, a mobile body 200 including a support device 210 provided in a dump track DT, a management device 300, and a support device 400; and may be configured to be communicable via a communication network 900.

The support device 210 is a portable terminal device, for example, a computer such as a notebook PC, tablet PC, smartphone, or the like set up in the dump track DT.

The management device 300 is a fixed terminal device, for example, a server computer installed in a management center or the like outside a work site. Note that the management device 300 can be a portable computer (e.g., a portable terminal device such as a notebook PC, tablet PC, or smartphone).

The support device 400 is a portable terminal device, such as a notebook PC, a tablet PC, or a smartphone carried by the operator or the like present on a work site.

The controller 30 of the shovel 100 may transmit the calculated weight of the earth and sand to the management device 300 via the communication device T1 and the communicating network 900. Also, the controller 30 of the shovel 100 may transmit the calculated weight to the support device 210 provided on the dump truck DT via the communication device T1 and the communicating network 900.

As described above, the embodiments and the like of the shovel 100 have been described; note that the present inventive concept is not limited to the embodiments and the like described above, and various modifications and improvements can be made within the scope of the subject matter of the present inventive concept as set forth in the claims.

What is claimed is:

1. A shovel comprising:
   an attachment attached to a revolving upper body; and
   a control device including a memory and a processor configured to execute
      estimating a center of gravity of loaded matter loaded in the attachment, and
      calculating a weight of the loaded matter based on the estimated center of gravity of the loaded matter.

2. The shovel as claimed in claim 1, wherein the attachment includes a boom, an arm, and a bucket, and
   wherein the estimating estimates the center of gravity of the loaded matter loaded in the bucket in a state of the bucket regarded as taking a predetermined angle.

3. The shovel as claimed in claim 2, wherein the state of the bucket regarded as taking the predetermined angle is a state of the boom being at a location higher than a predetermined position.

4. The shovel as claimed in claim 2, further comprising:
   a space recognition device configured to capture an image of the bucket,
   wherein whether or not the bucket is in the state regarded as taking the predetermined angle is determined based on the image captured by the space recognition device.

5. The shovel as claimed in claim 1, wherein the attachment includes a boom, an arm, and a bucket, the shovel further comprising:
   a boom cylinder configured to drive the boom;
   an arm cylinder configured to drive the arm; and
   a bucket cylinder configured to drive the bucket,
   wherein the estimating estimates the center of gravity of the loaded matter based on a flow of hydraulic oil to the bucket cylinder.

6. The shovel as claimed in claim 5, further comprising:
   a spool valve configured to control the flow and a direction of the hydraulic oil supplied to the bucket cylinder; and
   a spool displacement sensor configured to detect displacement of the spool valve,
   wherein the estimating estimates the center of gravity of the loaded matter based on the displacement of the spool displacement sensor.

7. The shovel as claimed in claim 1, wherein the processor is further configured to execute calculating a target excavation weight based on the weight of the loaded matter and a remaining loadable weight.

8. The shovel as claimed in claim 7, wherein the processor is further configured to execute setting a target trajectory as a trajectory to be traced by a predetermined part of the attachment, based on an excavation weight.

9. The shovel as claimed in claim 8, wherein the processor is further configured to execute using information on a landform before excavation starts, when setting the target trajectory.

10. The shovel as claimed in claim 7, wherein data related to a target construction surface is stored in advance in the memory in the control device.

11. A control device of a shovel used in the shovel including an attachment attached to a revolving upper body, wherein the control device control device includes a memory and a processor configured to execute
    estimating a center of gravity of loaded matter loaded in the attachment, and
    calculating a weight of the loaded matter based on the estimated center of gravity of the loaded matter.

12. The control device of the shovel as claimed in claim 11, wherein the processor is further configured to execute calculating a target excavation weight based on the weight of the loaded matter and a remaining loadable weight.

13. The control device of the shovel as claimed in claim 11, wherein the processor is further configured to execute setting a target trajectory as a trajectory to be traced by a predetermined part of the attachment, based on an excavation weight.

14. The control device of the shovel as claimed in claim 13, wherein the processor is further configured to execute using information on a landform before excavation starts, when setting the target trajectory.

* * * * *